(12) United States Patent
Chen et al.

(10) Patent No.: US 7,965,445 B2
(45) Date of Patent: Jun. 21, 2011

(54) HIGH SAG OPTICAL LENS AND METHOD FOR FAST MOLDING THE SAME

(75) Inventors: Huang-Chang Chen, Taipei (TW); Chih-Peng Wang, Taipei (TW); Te-Cheng Lin, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/729,579

(22) Filed: Mar. 23, 2010

(65) Prior Publication Data

US 2011/0075264 A1 Mar. 31, 2011

(30) Foreign Application Priority Data

Sep. 30, 2009 (TW) .............................. 98133158 A

(51) Int. Cl.
  G02B 27/10 (2006.01)
  G03B 21/56 (2006.01)
(52) U.S. Cl. ........................................ 359/619; 359/443
(58) Field of Classification Search .......... 359/618–622, 359/626, 443, 454–455, 625; 264/1.1, 2.7, 264/1.32
See application file for complete search history.

(56) References Cited

U.S. PATENT DOCUMENTS

| | | | |
|---|---|---|---|
| 7,159,420 B2 | 1/2007 | Autery et al. | |
| 7,349,161 B1 | 3/2008 | Shyu et al. | |
| 7,540,982 B2 | 6/2009 | Shyu et al. | |
| 2003/0003186 A1 * | 1/2003 | Border et al. | 425/542 |
| 2005/0172671 A1 | 8/2005 | Yoneda et al. | |
| 2005/0242454 A1 | 11/2005 | Yuasa et al. | |
| 2006/0107695 A1 | 5/2006 | Chen | |
| 2007/0043463 A1 | 2/2007 | Ueno | |
| 2007/0091443 A1 | 4/2007 | Lim et al. | |

FOREIGN PATENT DOCUMENTS

| | | |
|---|---|---|
| EP | 0648712 | 4/1995 |
| JP | 61291424 | 12/1986 |
| JP | 63295448 | 12/1988 |
| JP | 08-337428 | 12/1996 |
| JP | 2000044260 | 2/2000 |
| JP | 2001033611 | 2/2001 |
| JP | 2002003225 | 1/2002 |
| JP | 2005286730 | 10/2005 |
| JP | 20060191861 | 7/2006 |
| JP | 2006337985 | 12/2006 |
| JP | 2009046338 | 3/2009 |
| TW | I248919 | 5/2004 |
| TW | I256378 | 9/2004 |
| TW | 2006040807 | 5/2005 |
| TW | 095101830 | 1/2006 |
| TW | 095133807 | 9/2006 |

* cited by examiner

Primary Examiner — DaWayne A Pinkney
(74) Attorney, Agent, or Firm — WPAT, P.C.; Anthony King

(57) ABSTRACT

A high SAG optical lens and method for fast molding the same is disclosed, in which an optical lens is a single optical lens or an optical lens array formed by placing optical material between an upper mold and a lower mold for molding by heating and pressing processes; a formed rim is molded at the joint of the optical surface and the lens flange simultaneously. Therefore, it is convenient to fabricate the optical lens with high SAG and can eliminate the ghost phenomena effect occurring at the edge of the optical surface and the lens flange. Furthermore, since the feature of squeezing the melted optical material by the formed rim during the molding process, fast molding process can be successfully achieved.

13 Claims, 21 Drawing Sheets

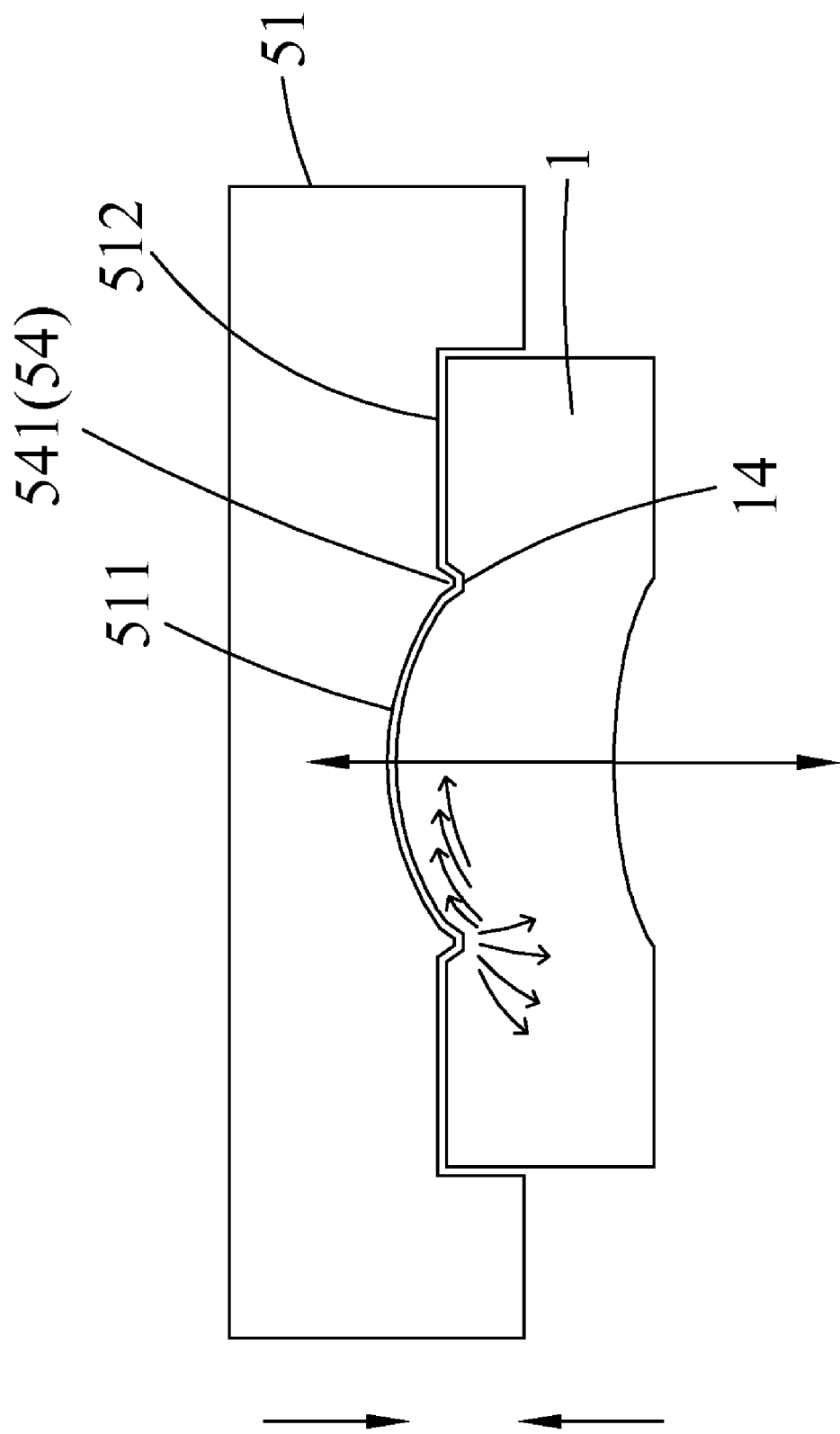

HIGH SAG OPTICAL LENS AND METHOD FOR FAST MOLDING THE SAME

BACKGROUND OF THE INVENTION

1. Field of the Invention

The present invention relates to a high SAG optical lens and method for fast molding the same; in particular, it relates to an optical lens having a formed rim structure which is fabricated through glass molding or plastic molding process. The optical lens can be used for the optical zoom lens of a camera or of an optical system.

2. Description of Prior Art

The technologies of glass precision molding or plastic precision molding have been comprehensively applied to making aspheric molding glass (plastic) lens, which is characterized in high resolution, excellent stability and competitive manufacture cost, such as those disclosed in US2006/0107695, US2007/0043463, Taiwan Patent TW095101830, TW095133807, Japan Patent JP63-295448 and the like. They use the feature of glass (plastic) melted at high glass transition temperature, in which a glass preform or a plastic resin is placed into a mold cavity constituted by the upper mold and the lower mold, for heating and softening. Then the upper mold core and the lower mold core are closed and clamped for pressing, such that the mold surfaces are transferred onto the softened glass preform (or plastic resin). After cooling, the upper mold core and the lower mold core are separated to obtain the optical lens product with optical surfaces by transferring the upper and lower mold cores. Refer first to FIG. 1, a glass or plastic material 4 is placed into a mold cavity which is formed between an upper mold 951 and a lower mold 952, and is heated to exceed its glass inversion point, allowing the glass or plastic material 4 to be in a softened or melted state. The upper mold 951 and the lower mold 952 are respectively configured with a forming surfaces of the optical surfaces, and they can apply pressure and cast the softened glass or plastic material when they are closed and clamped, thus forming an optical lens 91, such that the forming surfaces of the upper mold 951 and the lower mold 952 are transferred onto the optical lens 91, accordingly creating two optical surfaces on the optical lens 91. However, for the curved surface of greater curvature radius, the altitude of optical lens is smaller (low SAG) and the molding process is simpler; whereas in terms of surface with smaller curvature radius, the altitude of optical lens may be greater (high SAG), the molding process thereof thus becomes more challenging.

In conventional moldings, to deal with the optical surface having a complicated structure or high SAG, it is usual to take the approach of heating process in order to soften the glass or plastic material 4, thus increasing the liquidity and decreasing the viscosity by using higher molding temperature thereof to facilitate the molding process. However, such an approach may cause drawbacks such as prolonged manufacture period or undesirable molding stickiness. An alternative approach is stacking a higher SAG optical lens, such as disclosure in Japan Patent JP2006-337985 and US Patent US20070091443, which is using the UV plastic and configure a multi-layer structure on the molding tools to mold an optical lens array. In order to achieve precision molding, to solve the problems of lithographic in the glass or plastic material 4 and the mold cavity, another conventional approach is to draw out air from the mold cavity for reaching a vacuum status, thereby preventing occurrences of air gaps in the mold cavity adversely affecting the formation of the optical surface. Nevertheless, such a solution may cause disadvantages in extra manufacture cost and slow process speed. Besides, the disclosures of Japan Patent JP2002-003225, JP05-286730, JP06-191861, US Patent US2005/0172671, EU Patent EP0648712 and Taiwan Patent TW I256378 attempt to resolve the problem of air residue by adjusting pressure, temperature or surface roughness and so forth to control operational conditions. Moreover, the disclosures of Japan Patent JP61-291424, JP2000-044260, Taiwan Patent TWI248919, TW200640807, US Patent US2005/0242454, and the like propose air tunnels configured in the molding equipments as the outlets for air expulsion; or otherwise, in the disclosures of Japan Patent JP61-291424, JP08-337428, JP2009-046338, JP2001-033611, U.S. Pat. No. 7,159,420 etc., grooves or air outlets are installed on the molding tools for removing the air. Now refer to FIG. 2, grooves 9514 are randomly configured on a flange transfer surface 9512 of a non-optical surface along the flange of an upper transfer surface 9513 in the optical surface of the upper mold 951; upon molding, air can be released through the groove 9514. Referring to FIG. 3, a groove transfer surface 9533 is configured on the lower transfer surface 9523 in the optical surface of the lower mold 952. However, such grooves or air outlets may correspondingly create bumps on the molded lenses, causing problems of requirements on secondary machining or difficulties in subsequent assemblage.

The lens flange of the optical lens is an optically inactive zone; for example, U.S. Pat. No. 7,349,161 and U.S. Pat. No. 7,540,982 use the lens flange to install an indentation for measuring eccentricity. Refer to FIG. 4, wherein an indentation 914 is grooved on the lens flange 912 of the optical lens 91 and the optical surface 910, and an alignment 9141 is configured in the groove 914, in which the alignment 9141 and the optical lens 91 are concentric thereby using the alignment 9141 for the purpose of eccentricity measurement.

Refer to FIG. 9(A), in which the optical surface 12 of the optical lens 1 is able to refract the incident light Li through the optical surface 12 and forms an ejected light Lo focusing on a spot, thereby achieve the optical effect of the optical lens 1. However, due to various mold machining limitations and molding procedures, a buffer surface 15 is formed adjacent to the lens flange 11 and the optical surface 12 in the optical lens 1. The buffer surface 15 is characterized in an arc-shape surface, with a curvature radius of Rc, so the buffer surface 15 may act as a converging concave lens allowing the incident light Li' to change path into the ejected light Lo'; and further because of the curvature radius of Rc, the ejected light Lo' is converged into a concentrated light beam so that a ghost image is formed. Such a problem may frequently occur in the optical lens of high SAG surface.

Therefore, regards to the optical lens of high SAG surface, a feasible solution is imminently needed for effectively reducing manufacture cost, facilitating molding process and also preventing the ghost image.

SUMMARY OF THE INVENTION

The primary object of the present invention is to provide a high SAG optical lens made of glass material for use as the glass lens applied in an optical system; such as, a glass optical zoom lens applied of camera, a glass lens of cam-enabled mobile phone, or an objective lens of single Light Emitting Diode (LED).

The glass high SAG optical lens according to the present invention is made of a glass optical material which is placed between an upper mold and a lower mold for molding, the glass optical material is usually a glass preform for fabricating a single optical lens through heating and pressing process; the single optical lens of this invention comprising: a first optical surface, a second optical surface, a lens flange and at least one formed rim. The first optical surface and the second optical surface are molded to form optically active zones, as well as the first optical surface and the second optical surface are opposite along optical axis. The lens flange is molded to form optically inactive zone peripherally on the side of optically active zones. The formed rim is molded with the first optical surface, the second optical surface and the lens flange simultaneously, and the formed rim adjacent to the lens flange with one of first optical surface and second optical surface. By aforementioned structure, it is convenient to produce a glass high SAG optical lens according to the present invention. Herein the formed rim may be a formed indentation of a groove profile or a formed tread having an embossed profile.

It is another object of the present invention to provide a high SAG optical lens made of plastic material for use as the plastic lens applied in an optical system; such as, a plastic optical zoom lens applied to camera, a plastic lens of cam-enabled mobile phone, or an objective lens of single Light Emitting Diode (LED). The plastic high SAG optical lens can be fabricated by injecting a plastic optical material into the mold cavity formed between an upper mold and a lower mold by an injection feeder and pressing through molds to obtain a single optical lens. The single optical lens of this invention comprising: a first optical surface, a second optical surface, a lens flange and at least one formed rim. The first optical surface and the second optical surface are molded to form optically active zones, as well as the first optical surface and the second optical surface are opposite along optical axis. The lens flange is molded to form optically inactive zone peripherally on the side of optically active zones. The formed rim is molded with the first optical surface, the second optical surface and the lens flange simultaneously, and the formed rim is adjacent to the lens flange with one of first optical surface and second optical surface. By aforementioned structure, it is convenient to produce a plastic high SAG optical lens according to the present invention. Herein the formed rim may be a formed indentation of a groove profile or a formed tread having an embossed profile.

It is another object of the present invention to provide a method for manufacturing the high SAG optical lens by using glass material. The method comprises the following steps:

S1: providing a glass molding mold comprising an upper mold and a lower mold. The upper mold is configured with an upper transfer surface and a flange transfer surface, and the lower mold configured with lower transfer surface and a flange transfer surface. One of the upper mold and the lower mold or both of them is/are further configuring with a forming aid fixture connected to the upper/lower transfer surface and the flange transfer surface;

S2: placing a glass preform into the mold cavity which is formed between the upper mold and the lower mold;

S3: heating and pressing both the upper mold and the lower mold in order to mold and transfer the upper transfer surface, lower transfer surface, flange transfer surface and the forming aid fixture onto the glass preform;

S4: separating the upper mold and the lower mold after cooling, thereby obtaining a glass high SAG optical lens. The high SAG optical lens is featuring with the first optical surface, the second optical surface and at least one formed rim adjacent to the lens flange.

Alternatively, a method for manufacturing the high SAG optical lens of a plastic material is also provided, comprising the following steps:

SS1: providing a plastic molding mold comprising an upper mold and a lower mold. The upper mold is configured with an upper transfer surface and a flange transfer surface. The lower mold is configured with lower transfer surface and a flange transfer surface. One of the upper mold and the lower mold or both of them is/are further configured with a forming aid fixture connected to the upper/lower transfer surface and the flange transfer surface;

SS2: closing the upper mold and the lower mold;

SS3: injecting softened plastic material into the mold cavity by an injection feeder, in which the mold cavity is formed between the upper mold and the lower mold;

SS4: clamping the upper mold and the lower mold in order to mold and transfer the upper transfer surface, lower transfer surface, flange transfer surface and the forming aid fixture onto the softened plastic material;

SS5: separating the upper mold and the lower mold after cooling, thereby obtaining a plastic high SAG optical lens. The high SAG optical lens is featuring the first optical surface; the second optical surface and at least one formed rim adjacent to the lens flange.

It is further object of the present invention to provide a method for manufacturing the high SAG optical lens of glass or plastic material, which is achieved by cutting and singularizing an optical lens array into individual optical lenses.

Thus, the method for manufacturing the optical lens array and the high SAG optical lens made of a glass material, comprising the following steps:

SA1: providing a glass molding mold comprising an upper mold and a lower mold. The upper mold is configured with a plurality of upper transfer surfaces and a flange transfer surface. The lower mold is configured with a plurality of lower transfer surfaces and a flange transfer surface. One of the upper mold and the lower mold or both of them is/are further configuring with a plurality of forming aid fixtures connected to the upper/lower transfer surface and the flange transfer surface;

SA2: placing a preform of glass material into the mold cavity which is formed between the upper mold and the lower mold;

SA3: heating and pressing both the upper mold and the lower mold in order to mold and transfer the plurality of upper transfer surfaces, a plurality of lower transfer surfaces, flange transfer surface and the plurality of forming aid fixtures onto the preform;

SA4: separating the upper mold and the lower mold after cooling, thereby obtaining an optical lens array comprising a plurality of high SAG optical lenses; and SA5: cutting and singularizing the optical lens array and singularizing it into a plurality of single high SAG optical lenses.

Alternatively, a method for manufacturing the optical lens array and the high SAG optical lens made of a plastic material, comprising the following steps:

SSA1: providing a plastic molding mold which comprises an upper mold and a lower mold. The upper mold is configured with a plurality of upper transfer surfaces and a flange transfer surface. The lower mold is configured with a plurality of lower transfer surfaces and a flange transfer surface. One of the upper mold and the lower mold or both of them is/are further configuring with a plurality of forming aid fixtures connected to the upper/lower transfer surface and the flange transfer surface;

SSA2: closing the upper mold and the lower mold.

SSA3: injecting softened plastic material into the mold cavity by an injection feeder in which the mold cavity is formed between the upper mold and the lower mold;

SSA4: clamping the upper mold and the lower mold in order to mold and transfer a plurality of upper transfer surfaces, a plurality of lower transfer surfaces, flange transfer surface and a plurality of forming aid fixtures onto the softened plastic material;

SSA5: separating the upper mold and the lower mold after cooling, thereby obtaining an optical lens array comprising a plurality of high SAG optical lenses; and;

SSA6: cutting the optical lens array and singularizing it into a plurality of single high SAG optical lenses.

The manufacture methods uses glass or plastic molding processes to make the high SAG optical lens having a formed rim, which is capable of not only eliminating drawbacks found in prior arts such as higher process temperature, longer formation time and the like, but also achieving the objective of fast molding through squeezing the melted optical material by the forming aid fixture of the present invention; in addition, the optical lens is fabricated in accordance with the method provides a feature of high SAG which allows to further remove the ghost image effect occurring at the joint of the optical surface and the lens flange by the formed rim.

BRIEF DESCRIPTION OF THE DRAWINGS

FIG. 8 shows a schematic diagram of the function in squeeze the melted optical material by the forming aid fixture in the molding process, in accordance with the present invention;

FIG. 9 shows two illustrative diagrams for comparison of ghost image effect.

DETAILED DESCRIPTION OF THE PREFERRED EMBODIMENTS

Figure 1:
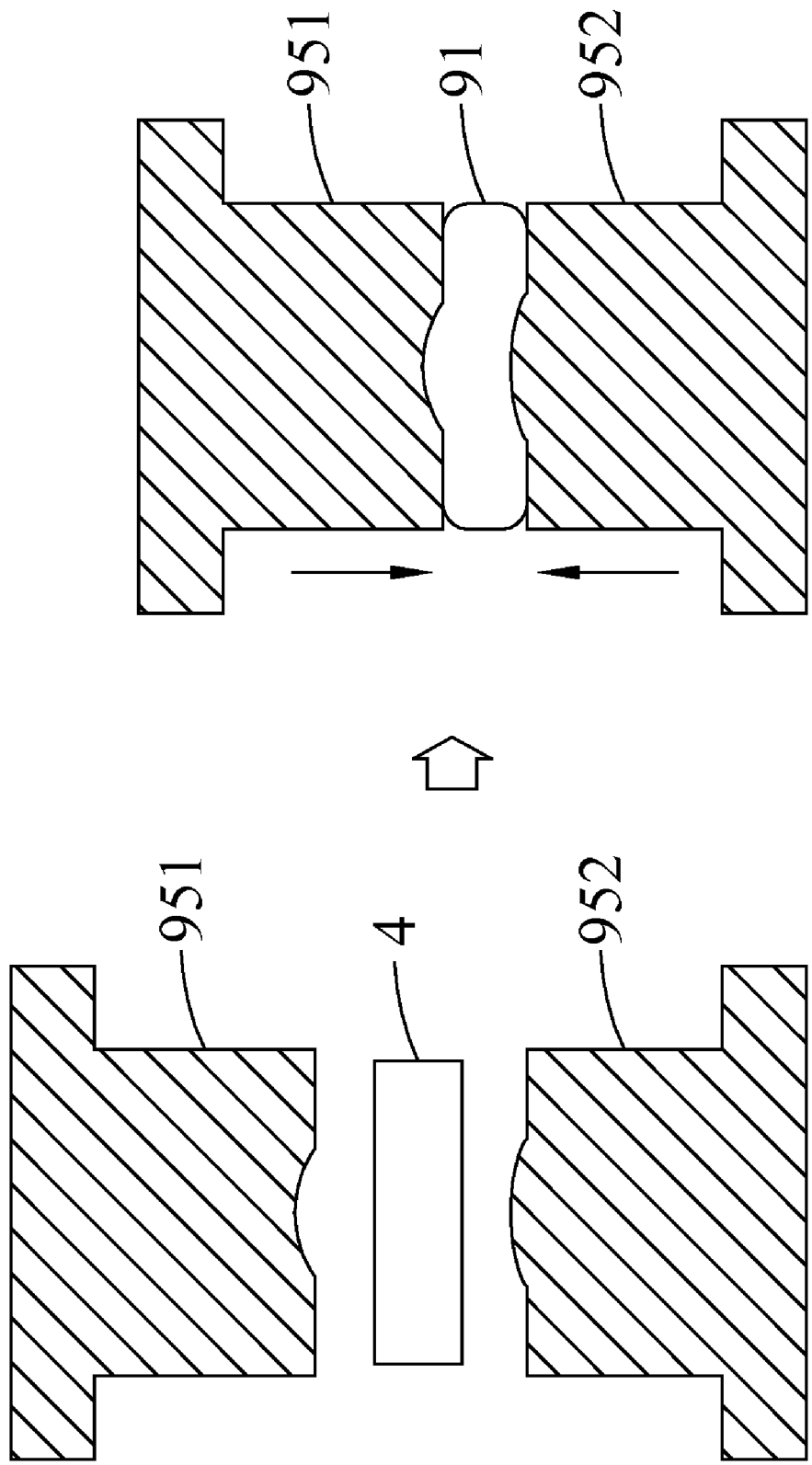
FIG. 1 is a diagram of conventional molding process for an optical lens.
Figure 2:
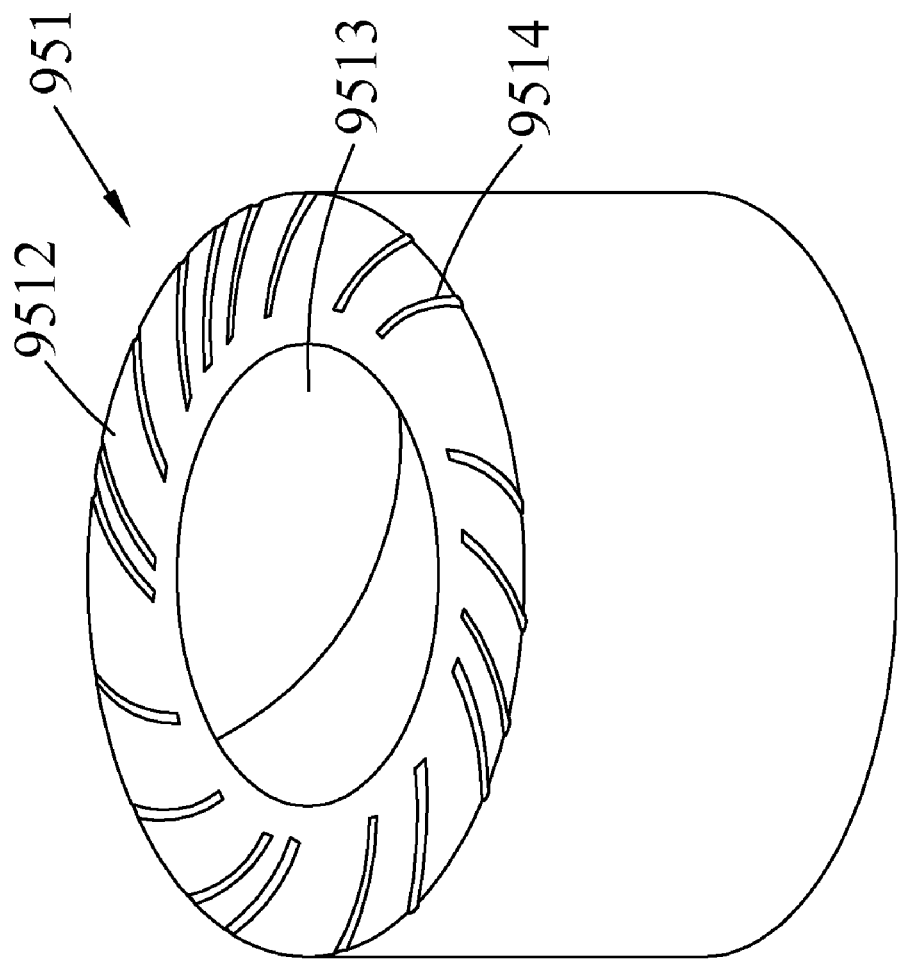
FIG. 2 is a diagram of another conventional molding mold with randomly configured gas expulsion grooves.
Figure 3:
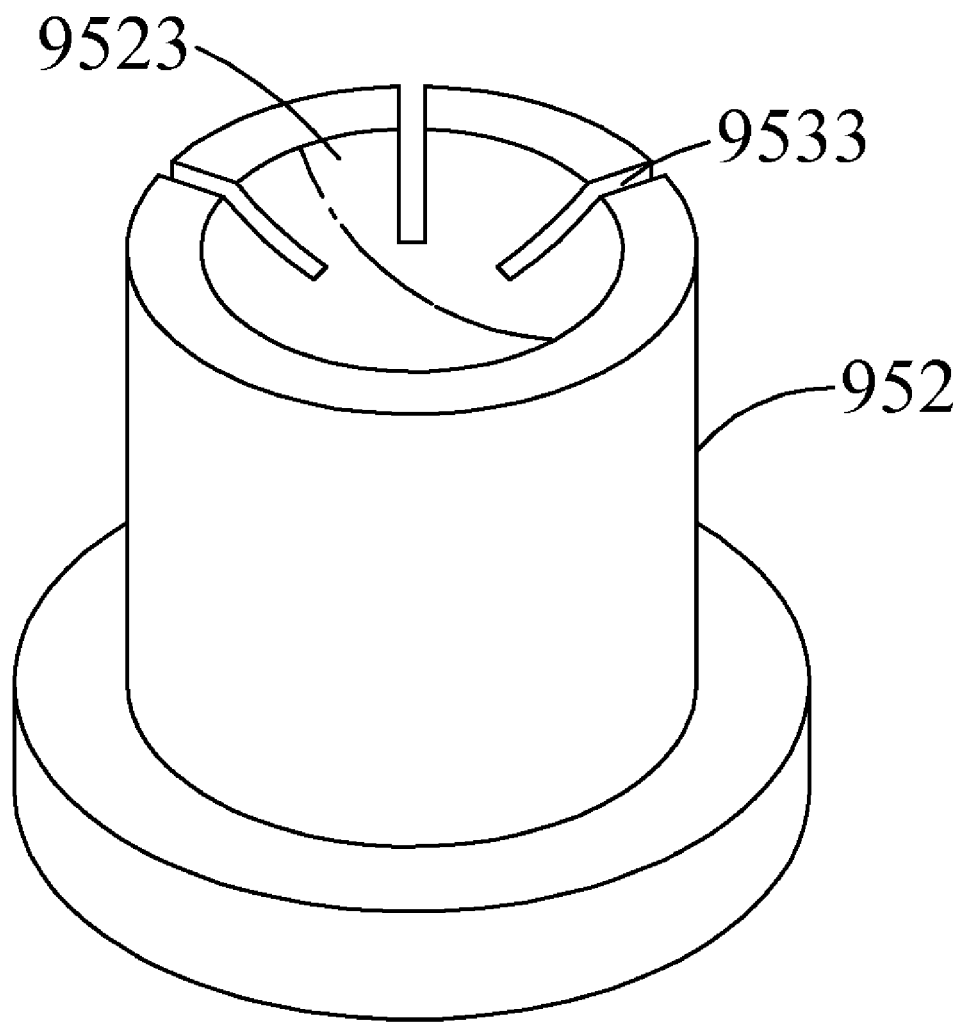
FIG. 3 is a diagram of another conventional molding mold with deep gas expulsion grooves.
Figure 4:
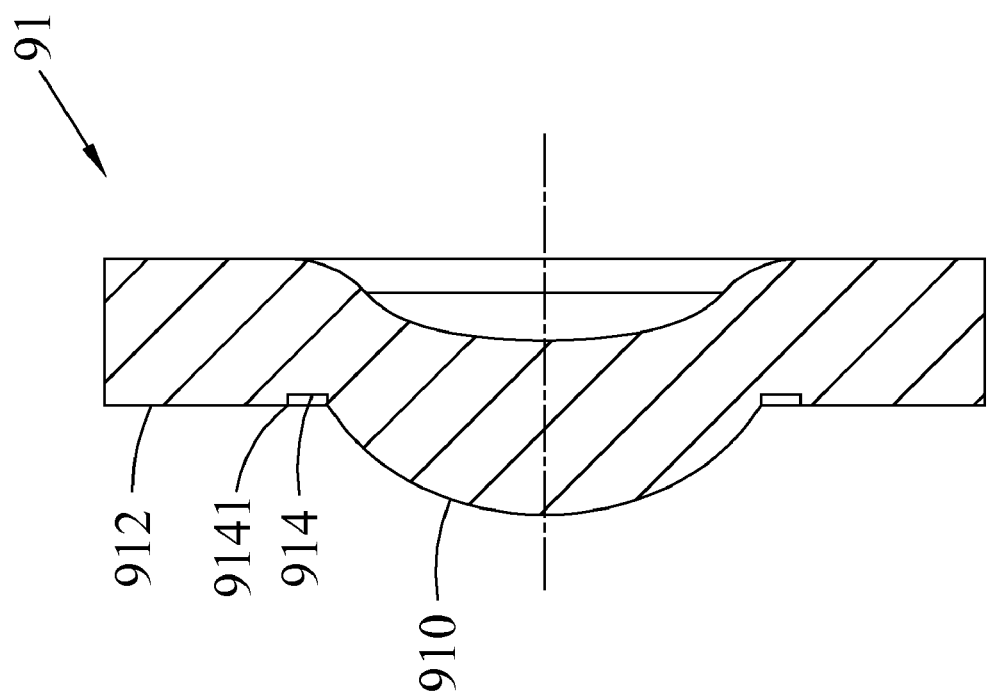
FIG. 4 is a diagram of a conventional molding optical lens with indentation for measuring eccentricity.
Figure 5:
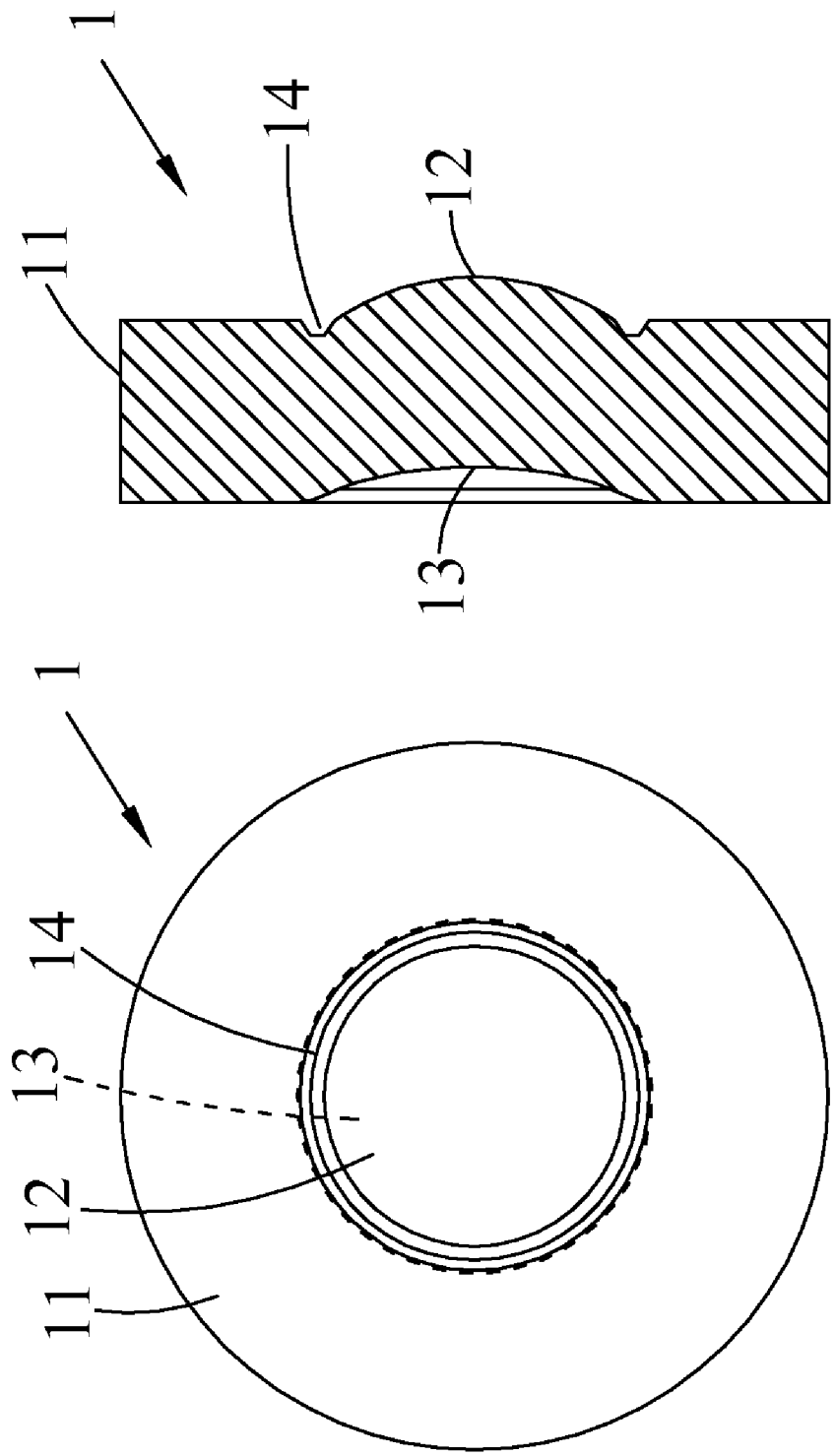
FIG. 5 shows a diagram of an optical lens having a formed rim, in accordance with the high SAG optical lens of the present invention.

Refer to FIG. 5, wherein a diagram of an optical lens having a formed rim, in accordance with the present invention, is shown. Herein the high SAG optical lens 1 comprises a first optical surface 12, a second optical surface 13 and a lens flange 11. The first optical surface 12 and the second optical surface 13 are on the optically active zones of the optical lens 1, commonly respectively configured on the opposite surfaces of the optical lens 1. The lens flange 11 is simultaneously one-piece molding with the optical lens 1 and is on the optically inactive zone of the optical lens 1. A formed rim 14 is formed in the optically inactive zone located between the first optical surface 12 and the lens flange 11. Hence, through the aforementioned structure, it is convenient to fabricate the optical lens 1 having the first optical surface 12 with high SAG. Herein the formed rim 14 may be replaced by a formed indentation of a groove profile or a formed tread profile having an embossed feature.

Figure 6:
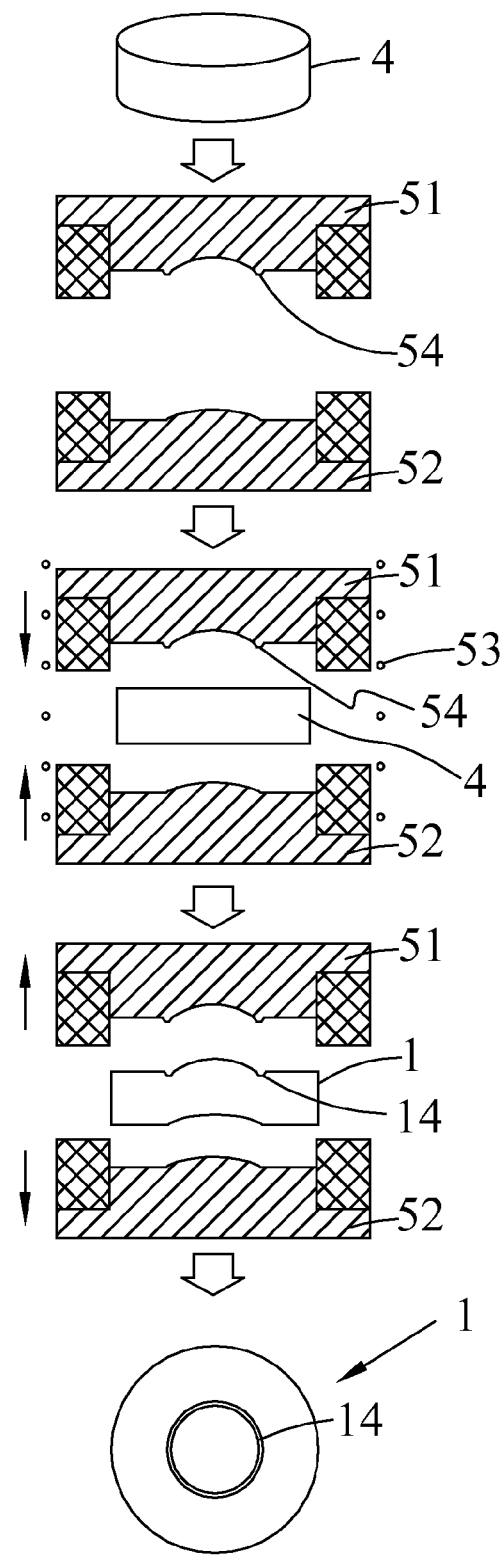
FIG. 6 shows a process for the first embodiment of the fast molding method, in accordance with the present invention.
Figure 7:
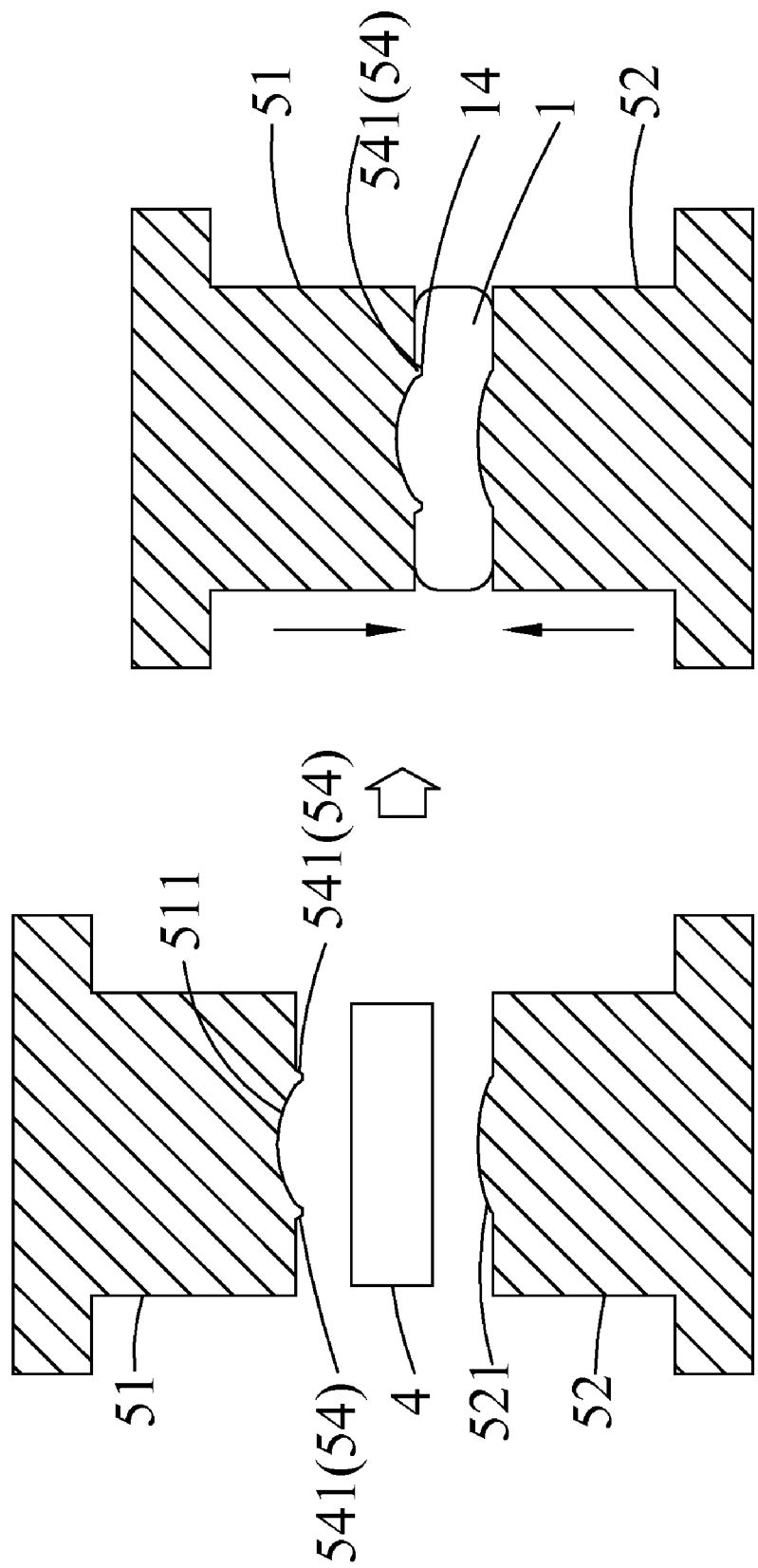
FIG. 7 shows a diagram for the first embodiment of the molding mold having a forming aid fixture and the molding steps, in accordance with the present invention.
Figure 20:
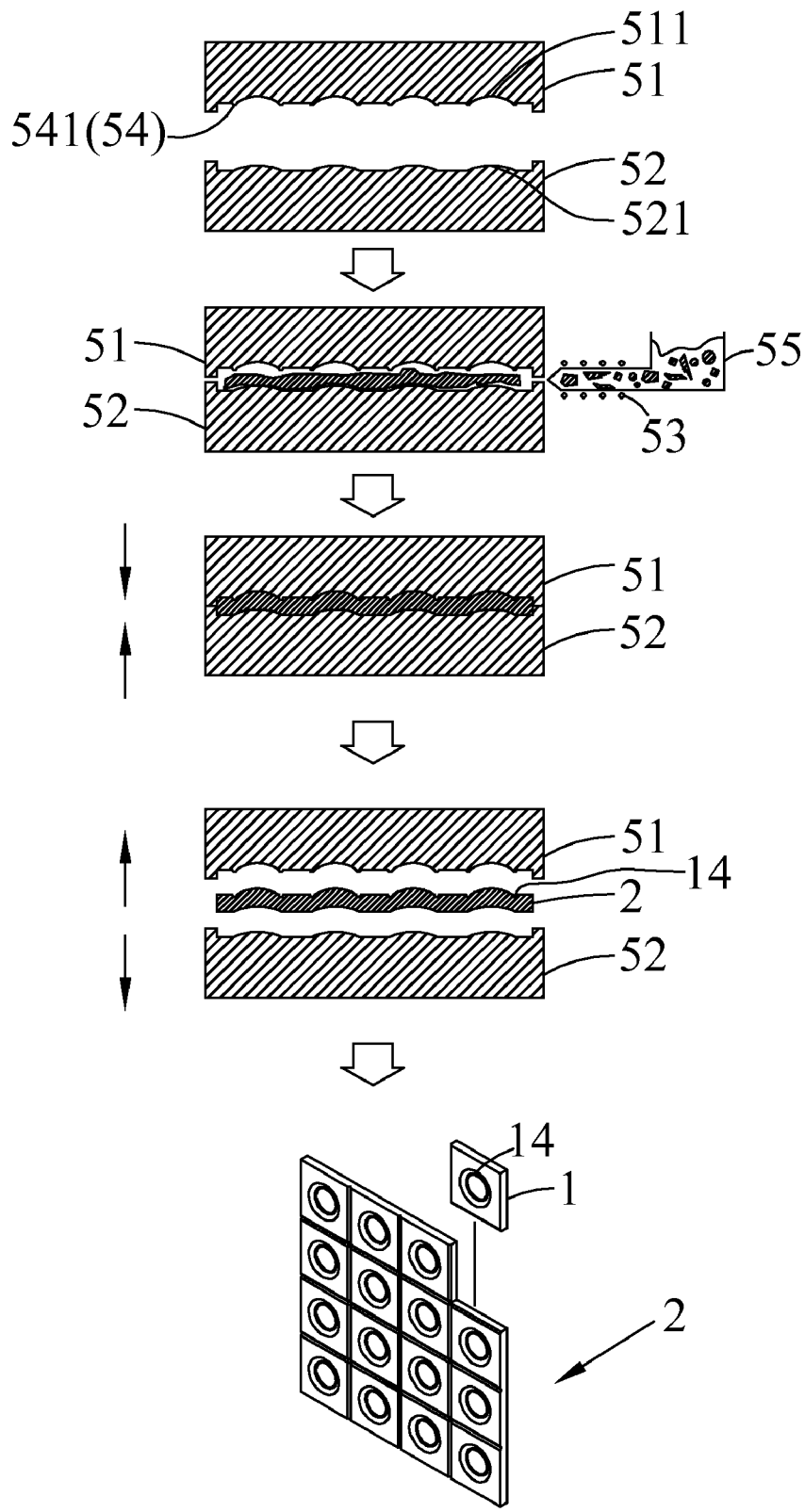
FIG. 20 shows a process for the fifth embodiment of the plastic molding method of the present invention.

Refer to FIG. 6, wherein a diagram for the manufacture method of a single optical lens, in accordance with the present invention, is shown. The manufacture method for the high SAG optical lens 1 according to the present invention comprises the following steps:

S1: providing a molding mold (molding mold applicable to glass molding or plastic molding). Refer to FIG. 7, wherein a diagram of the molding mold and the molding steps is shown. In the FIG. 7 and FIG. 8, the molding mold comprising an upper mold 51 and a lower mold 52, in which there on the upper mold 51 is configured with an optical transfer surface 511 as a first optical surface and a non-optical transfer surface 512, and there on the lower mold 52 is configured with a transfer surface 521 as a second optical surface and a non-optical transfer surface 522. The upper mold 51 is further configured with a forming aid fixture 54 which is between the optical transfer surface 511 and the non-optical transfer surface 512;

S2: for molding glass material, placing a preform 4 made of the glass material into the mold cavity formed between the upper mold 51 and the lower mold 52; alternatively, for molding a plastic material, closing in the upper mold 51 and the lower mold 52, injecting the softened plastic material into the mold cavity formed between the upper mold 51 and the lower mold 52 by an injection feeder 55 (refer also to FIG. 20, wherein a diagram for the fifth embodiment of the manufacture method of plastic molding);

S3: heating the upper mold 51 and the lower mold 52 by a heater 53 and pressing the upper mold 51 against the lower mold 52 in order to mold and transfer the optical transfer surface 511 of the upper mold 51, the optical transfer surface 521 of the lower mold 52, and the forming aid fixture 54 onto the softened preform 4 (or plastic material);

S4: after cooling, separating the upper mold 51 and the lower mold 52, thereby obtaining the optical lens 1 featuring the first optical surface 12, the second optical surface 13, the lens flange 11 and the formed rim 14.

Figure 19:
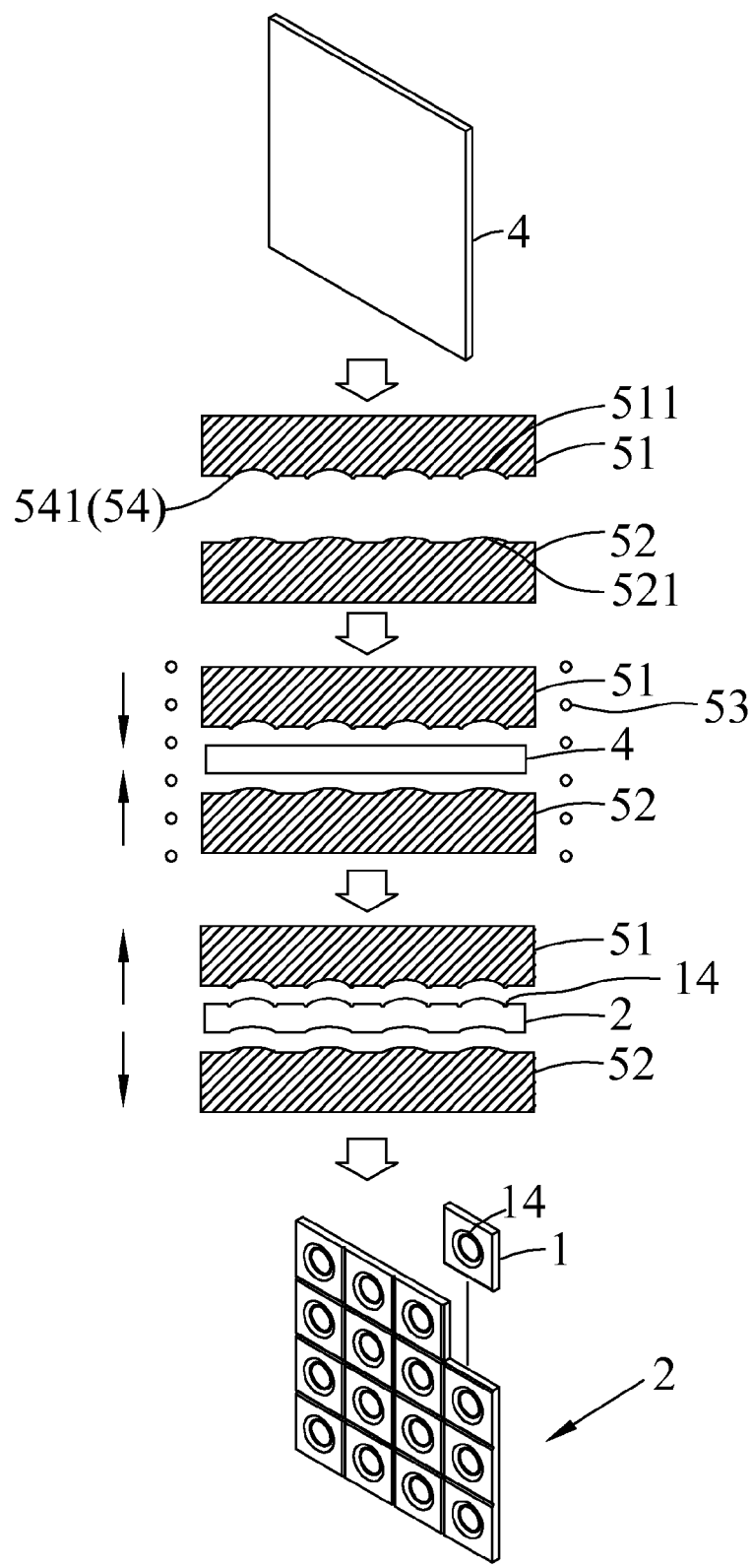
FIG. 19 shows a process for the fifth embodiment of the glass molding method of the present invention.

Refer next to FIG. 19 and FIG. 20, the high SAG optical lens 1 according to the present invention may be also fabricated by the form of an optical lens array 2, then cut and singularized the optical lens array 2 into a plurality of single optical lenses 1.

To better and more specifically describe the present invention in details, several preferred embodiments are set forth with the drawings in the following texts:

Embodiment 1

Refer to FIG. 5, the high SAG optical lens 1 has a formed rim 14 with recessed formed indentation groove. The high SAG optical lens 1, made of an optical glass material, comprising the first optical surface 12, the second optical surface 13, the formed rim 14, and the lens flange 11, whose optical parameters are listed in Table 1 as below:

TABLE 1

Optical Parameter Table of First Embodiment

| R1* | R2* | D | w | d |
|---|---|---|---|---|
| 0.47 | 0.80 | 1.60 | 0.11 | 0.05 |

*indicates aspheric surface

Herein $R_1$ is the radius (mm) of the first optical surface 12, $R_2$ is the radius (mm) of the second optical surface 13, D is the diameter (mm) of the optical lens 1, w is the width (mm) of the recessed formed indentation (the formed rim 14), and d is the depth (mm) of the recessed formed indentation (the formed rim 14).

Refer now to FIG. 7 and FIG. 8, the molding mold used in the present embodiment is illustrated, in which there on the upper mold 51 is configured with the optical transfer surface 511 for forming the first optical surface 12, the non-optical transfer surface 512 for forming the lens flange 11, and the forming aid fixture 54 for forming the formed rim 14. The forming aid fixture 54 located between the optical transfer surface 511 and the non-optical transfer surface 512. During molding process, the optical transfer surface 511 is allowed to mold and lithograph the upper part of softened glass material being the first optical surface 12, the forming aid fixture 54 is allowed to mold the upper part of softened glass material being the formed rim 14 with a groove profile (the formed indentation), and the non-optical transfer surface 512 is allowed to mold the softened glass material being the lens flange 11.

Refer to FIG. 6, wherein a diagram for the manufacture method of a single optical lens. As illustrated in FIG. 6, the molding method is: placing the preform 4 of a glass material into the mold cavity formed between the upper mold 51 and the lower mold 52, in which the preform 4 may be a glass gob, a glass plate, or any glass preform with a shape similar to the intended final product; heat the upper mold 51, the lower mold 52 and the preform 4 with a heater 53, such that the preform 4 reaches its glass transition point and starts to melt; closing in the upper mold 51 and the lower mold 52 with pressure, which allows the optical transfer surface 511 and non-optical transfer surface, the forming aid fixture 54 of the upper mold 51, the optical transfer surface 521 and non-optical transfer surface of the lower mold 52, to mold the preform 4. The perform 4 is molded and transferred by optical transfer surfaces (511, 521, 541 and non-optical transfer surfaces) to produce an optical lens. After cooling, separating the upper mold 51 and the lower mold 52, thereby is obtaining an optical lens 1 featuring with the first optical surface 12, the second optical surface 13, the lens flange 11 and the formed rim 14.

The formed rim 14 of the present embodiment is a formed indentation of a groove profile, whose depth d and width w are preferably adjusted to be consistent with the curvature radius $R_1$ of the first optical surface 12.

Refer now to FIG. 8, wherein a functional diagram of the forming aid fixture in the molding process is shown. When molding the optical lens 1, in the present embodiment, the upper mold 51 and the lower mold 52 squeeze the softened glass material, such that the softened glass material into the mold cavity starts to flow and to be squeezed to try to attach with optical transfer surfaces, thereby driving the softened glass material closely attach to the optical transfer surface 511 of the upper mold 51 to form the first optical surface 12. Suppose that the curvature radius $R_1$ of the first optical surface 12 is small (greater curvature radius indicates higher SAG), it is not easy to make the softened glass material flow into the cavity and attach to the optical transfer surface 511. In the prior arts, it usually applies higher temperature to increase the liquidity and lower viscosity of the glass material or otherwise increase the duration time of molding and consume longer time for cooling. However, in the present embodiment, through the forming aid fixture 54 of the upper mold 51, during the process of a relative motion of glass material and mold compression, the softened glass material are squeezed to move toward the mold cavity. Therefore, the glass material located under and outside of the forming aid fixture 54 is accordingly pushed downward or laterally squeezed, thus blocking the outward flow of the glass material within the mold cavity and allowing the softened glass material to be squeezed and closely attached to the optical transfer surface 511 so as to reach the objective of fast molding.

Figure 9A:
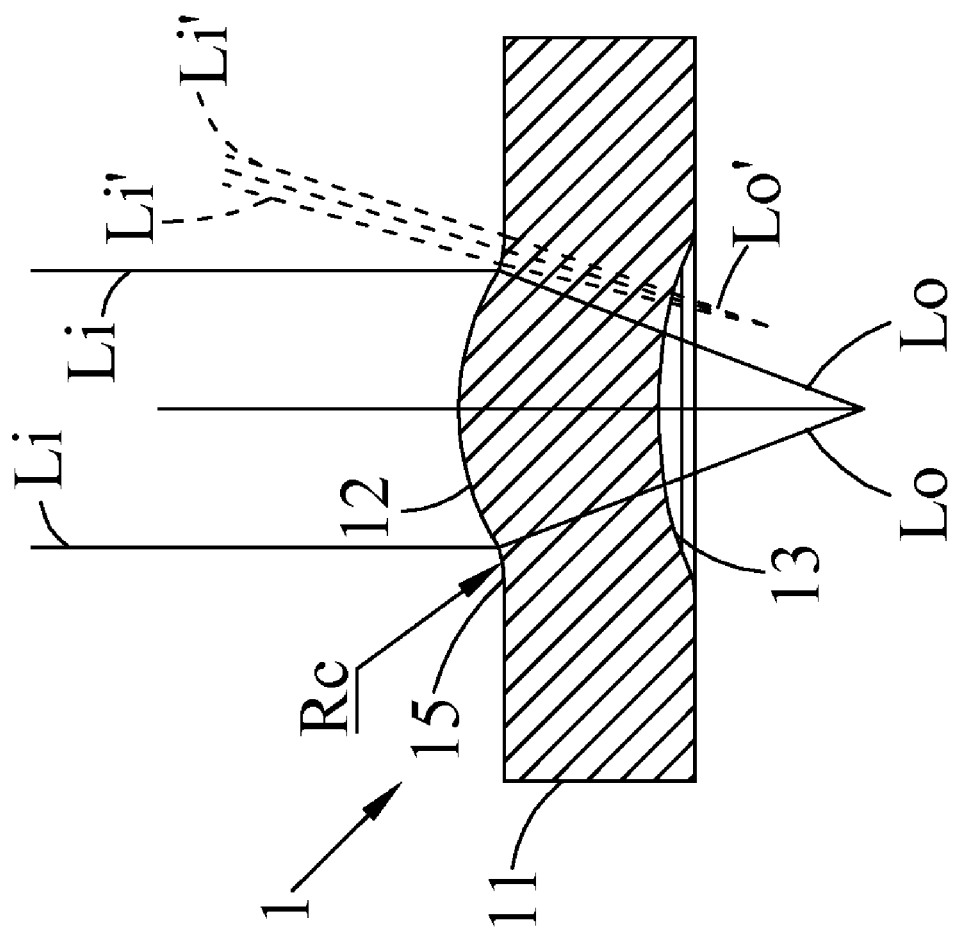
FIG. 9A shows the ghost image effect occurring in a conventional optical lens and FIG. 9B shows the prevention of the ghost image effect by the optical lens according to the present invention.

Refer to FIG. 9, wherein an illustrative diagram for comparing the ghost image effect occurring in a conventional optical lens and the optical lens of this is shown. Herein FIG. 9(A) is a conventional optical lens 1 without the formed rim 14, in which the parallel light Li within the range of the view angle of the first optical surface 12 is refracted into light Lo and converges onto optical axis Oc by the first optical surface 12 (only the convergence effect of the first optical surface 12 is depicted in the Figure). However, due to mechanical limitation on the upper mold 51, a buffer surface 15 exists in the adjacent zone of the first optical surface 12 and the lens flange 11. The buffer surface 15 with arc-shaped and radius of Rc is generated specifically in high SAG surface. The buffer surface 15 is analogous to a small-sized concave optical surface which allows light Li' outside the view angle of the first optical surface 12 to be refracted by the buffer surface 15 into light Lo' and converges outside of the optical axis Oc (only the convergence effect of the buffer surface 15 is depicted in the FIG. 9A). Thus, the ghost image effect is occurred.

Figure 9B:
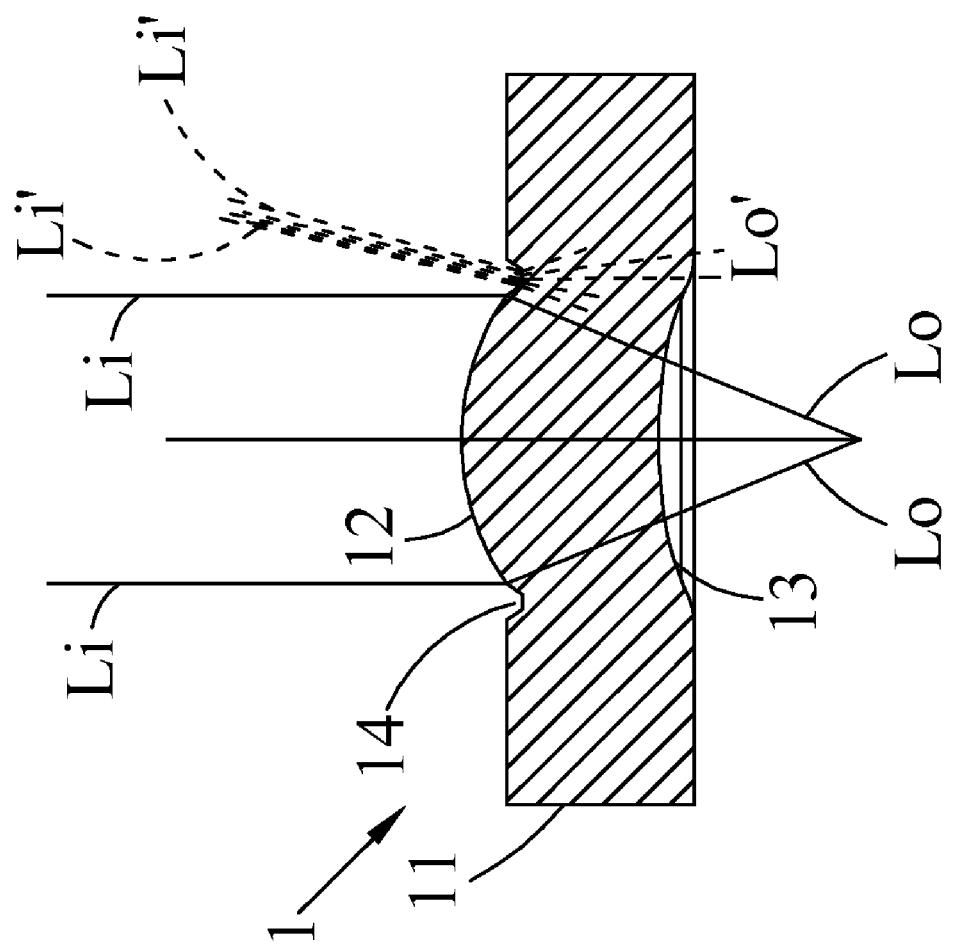

Furthermore, for the optical lens 1 with the formed rim 14 according to the present embodiment shown in FIG. 9(B), light Li inside the range of the view angle of the first optical surface 12 is refracted by the first optical surface 12 into a light Lo and focuses on the optical axis Oc (only the convergence effect of the first optical surface 12 is depicted in the Figure). Since the indentation formed rim 14 is located between the first optical surface 12 and the lens flange 11, when light Li' outside the range of the view angle of the first optical surface 12 is refracted by the indentation formed rim 14 into light Lo', the groove profile of the indentation formed rim 14 makes the incident light Li' be refracted into light Lo' from different angles, thereby creating a diffractive result and unable to focus in a point, accordingly preventing (or eliminating) the ghost image effect.

Embodiment 2

Figure 10:
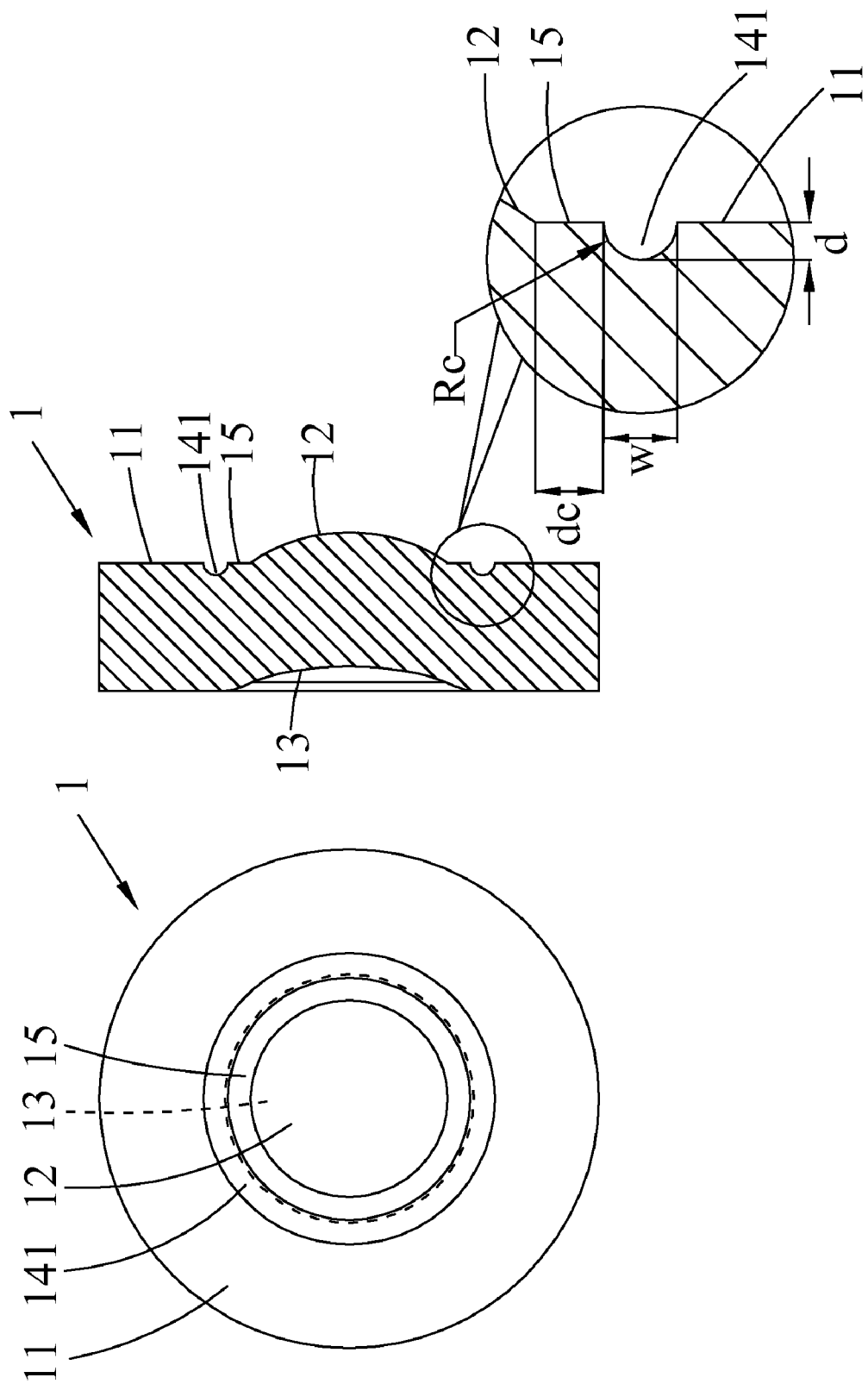
FIG. 10 shows a diagram for a second embodiment of the present invention.

Refer next to FIG. 10, a diagram for a second embodiment of the present invention is shown. The present embodiment illustrates a high SAG optical lens 1 with the formed rim 14 having a buffer surface 15 which the optical lens 1 is made of a PC plastic material. The structure of the formed rim 14 in the present embodiment is including the buffer surface 15 and the formed indentation 141, in which the buffer surface 15 is between the first optical surface 12 and the formed indentation 141, while the formed indentation 141 is between the buffer surface 15 and the lens flange 11. The high SAG optical lens 1 comprises the first optical surface 12, the second optical surface 13, the formed rim 14, and the lens flange 11, whose optical parameters are listed in Table 2 as below:

TABLE 2

Optical Parameter Table of Second Embodiment

| R1* | R2* | D | w | d | Rc** | dc |
|---|---|---|---|---|---|---|
| 0.47 | 0.80 | 1.60 | 0.11 | 0.05 | 1.2 | 0.04 |

*indicates aspheric surface
**indicates equivalent radius

Herein $R_1$ is the radius (mm) of the first optical surface 12, $R_2$ is the radius (mm) of the second optical surface 13, D is the diameter (mm) of the optical lens 1, w is the width (mm) of the recessed formed indentation (the formed rim 14), d is the depth (mm) of the recessed formed indentation (the formed rim 14), Rc is the equivalent radius (mm) of the buffer surface 15, and dc is the arc length (mm) of the buffer surface 15.

Figure 11:
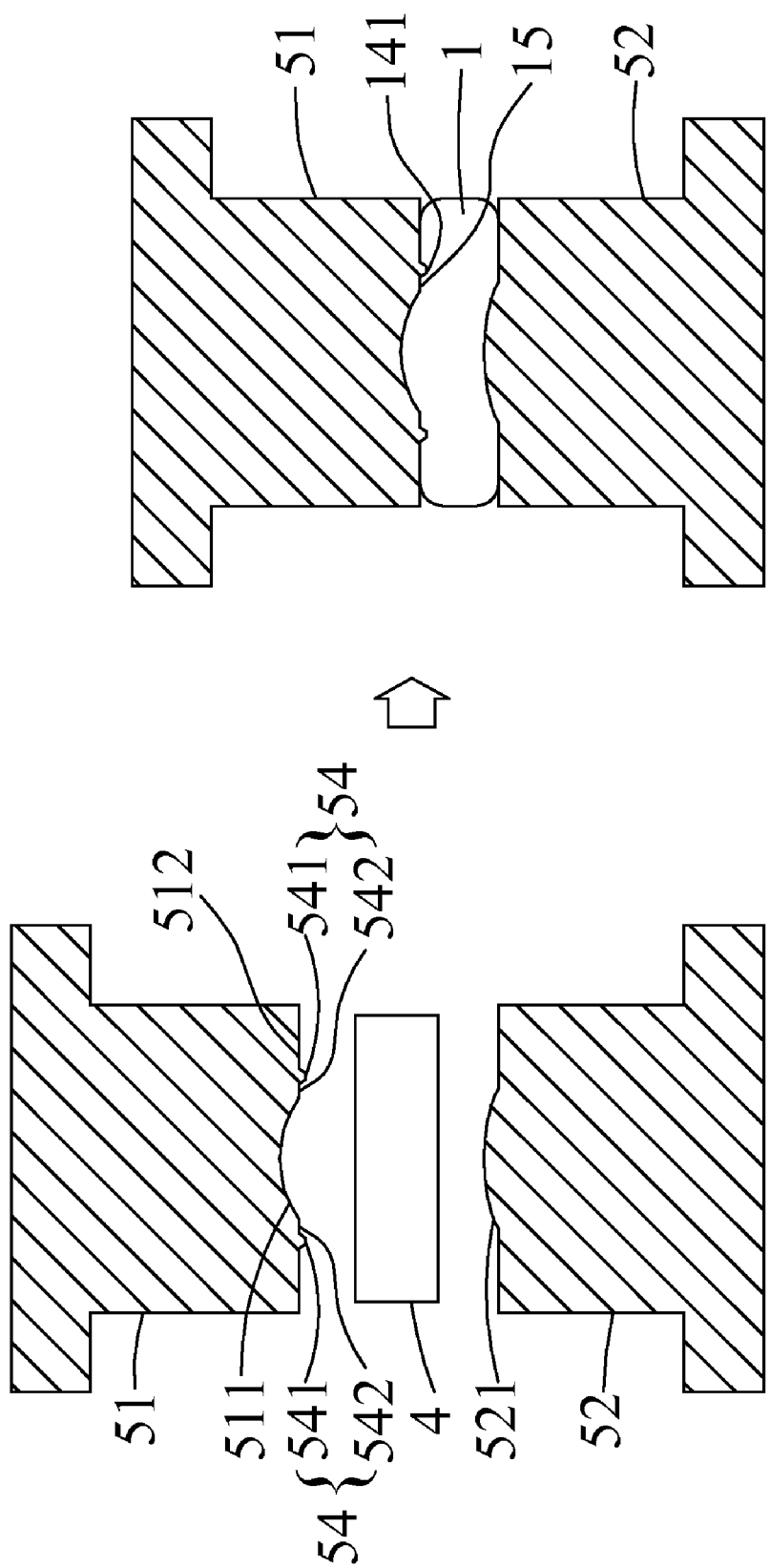
FIG. 11 shows a diagram for the second embodiment of the molding mold having a forming aid fixture and the molding steps, in accordance with the present invention.

Refer now to FIG. 11, wherein a diagram for the molding mold and molding steps of the second embodiment of the present invention is shown. The mold employed in the present embodiment is shown in FIG. 11, in which there on the upper mold 51 is configured with the optical transfer surface 511 for forming the first optical surface 12, the non-optical transfer surface 512 for forming the formed rim 14 and the forming aid fixture 54 for forming the formed rim 14. The forming aid fixture 54 between the optical transfer surface 511 and the non-optical transfer surface 512 comprises the buffer transfer surface 542 for forming the buffer surface 15 and the indentation transfer surface 541 for forming the formed indentation 141. During molding process, the optical transfer surface 511 is allowed to mold and lithograph the upper part of softened PC plastic material being the first optical surface 12, the forming aid fixture 54 (including the indentation transfer surface 541 and the buffer transfer surface 542) is allowed to mold the upper part of softened PC plastic material into the formed rim 14 of a groove profile (including the formed indentation 141 and the buffer surface 15), and the non-optical transfer surface 512 can mold the softened PC plastic material into the lens flange 11.

The molding method in the present embodiment is similar to which of the first embodiment (as FIG. 6), but the glass preform 4 is replaced by the PC plastic material which is injected into the mold cavity formed between the upper mold 51 and the lower mold 52 by an injection feeder (also reference to FIG. 20). The steps also comprises closing in the upper mold 51 and the lower mold 52 with pressure, molding and transferring the optical transfer surface 512 of the upper mold 51, the optical transfer surface 522 of the lower mold 52, and the forming aid fixture 54 onto the PC plastic material. After cooling, the upper mold 51 and the lower mold 52 is separated, thereby an optical lens 1 featuring the first optical surface 12, the second optical surface 13, the lens flange 11 and the formed rim 14 is obtained.

The formed rim 14 in the present embodiment comprises the groove-shaped formed indentation 141 and the buffer surface 15, in which the depth d, width w of the formed indentation 141, the equivalent radius Rc and arc length dc of the buffer surface 15 are better adjusted to be consistent with the curvature radius $R_1$ of the first optical surface 12.

During the molding process of the optical lens 1, the upper mold 51 and the lower mold 52 squeeze the softened PC plastic material into flowing. The PC plastic under and inside of the buffer transfer surface 542 is pushed and squeezed into the mold cavity to attach to the optical transfer surface, while the PC plastic material inside of the indentation transfer surface 541 is consistently squeezed toward the buffer transfer surface 542 to supplement the PC plastic material squeezed inward by the indentation transfer surface 541. Meanwhile, the PC plastic material under and outside of the indentation transfer surface 541 is pushed downward or laterally squeezed, thus blocking the outward flow of the PC plastic material within the mold cavity and allowing the softened PC plastic material to be pushed and closely attached to the optical transfer surface 511 of the first optical surface 51 so as to reach the objective of fast molding.

Embodiment 3

Figure 12:
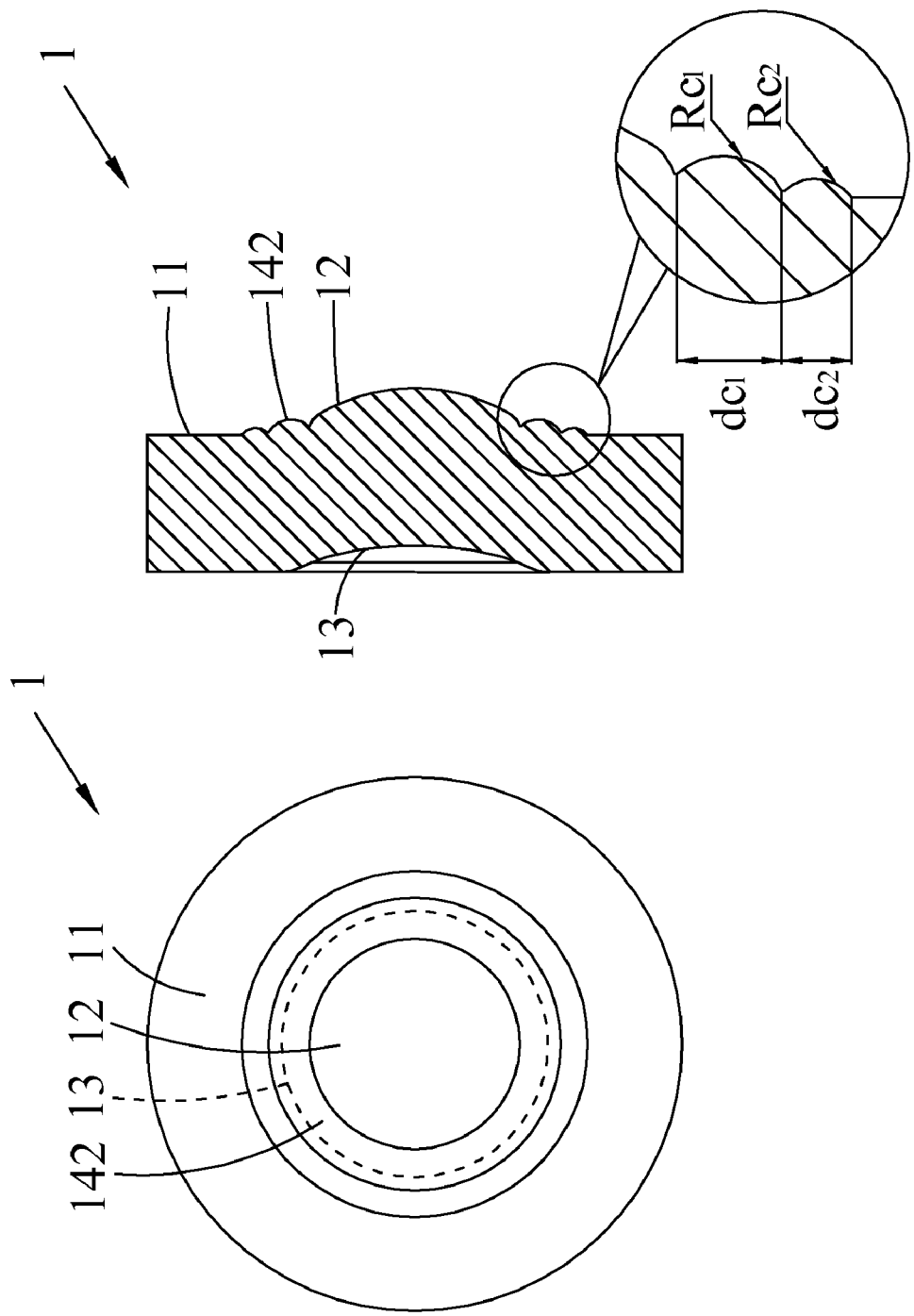
FIG. 12 shows a diagram for a third embodiment of the present invention.

Refer now to FIG. 12, wherein a diagram for a third embodiment of the present invention is shown. The present embodiment illustrates a glass high SAG optical lens 1 which comprises a first optical surface 12, a second optical surface 13, a formed rim 14 and a lens flange 11. The formed rim 14 is a formed tread 142 with an embossed profile. In the present embodiment, the formed tread 142 comprises two treads, but not limited thereto. The optical parameters are listed in Table 3 as below:

TABLE 3

Optical Parameter Table of Third Embodiment

| R1* | R2* | D | $Rc_1$ | $dc_1$ | $Rc_2$ | $dc_2$ |
|---|---|---|---|---|---|---|
| 0.91 | 1.07 | 2.0 | 0.09 | 0.15 | 0.06 | 0.10 |

*indicates aspheric surface

Herein $R_1$ is the radius (mm) of the first optical surface 12, $R_2$ is the radius (mm) of the second optical surface 13, D is the diameter (mm) of the optical lens 1, $Rc_1$ and $Rc_2$ respectively are the radius (mm) for each of the two treads in the formed tread 142, $dc_1$ and $dc_2$ respectively are the arc length (mm) for each of the two treads in the formed tread 142.

Figure 13:
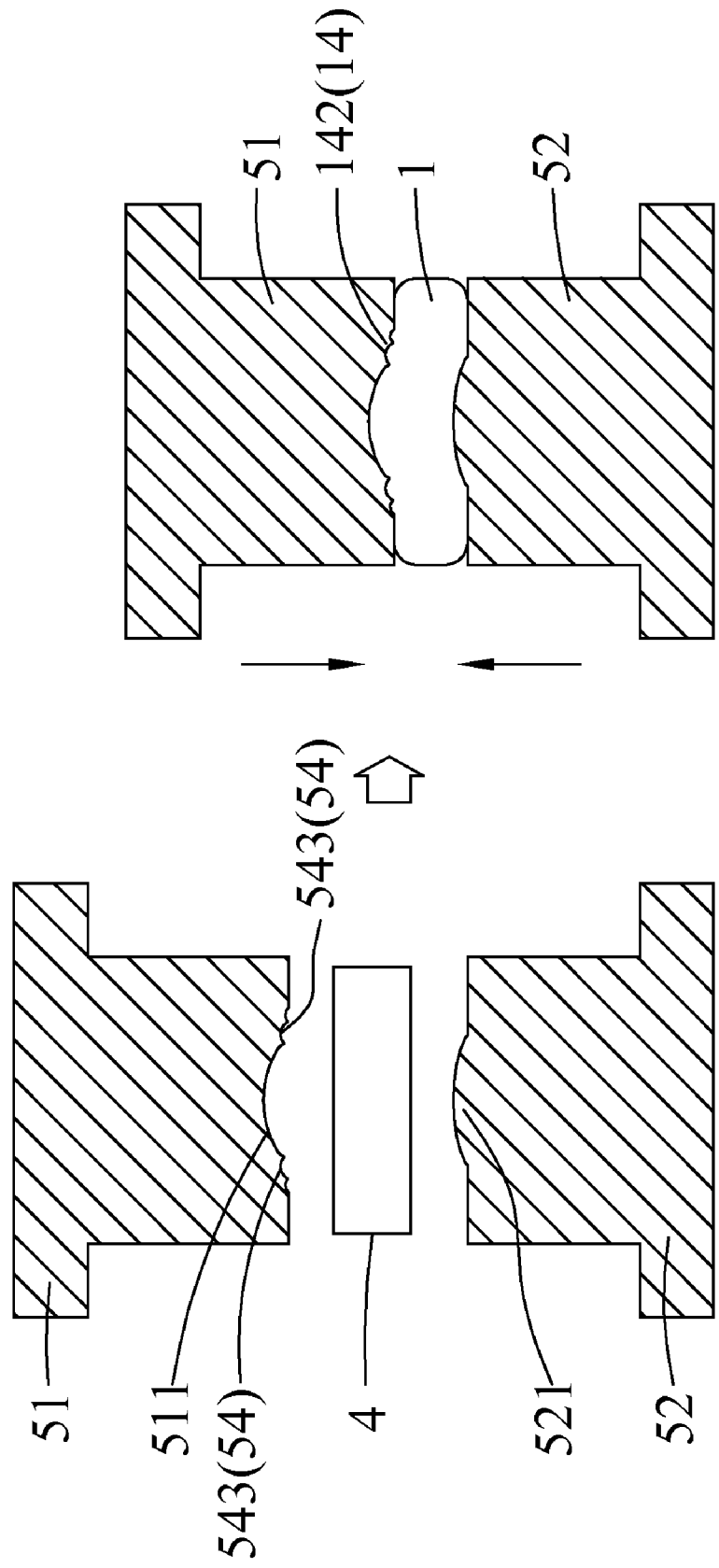
FIG. 13 shows a diagram for the third embodiment of the molding mold having a forming aid fixture and the molding steps, in accordance with the present invention.

Refer to FIG. 13, wherein a diagram for the third embodiment of the molding mold and molding steps of the present invention is shown. The mold employed in the present embodiment is shown in the FIG. 13, in which there on the upper mold 51 is configured with the optical transfer surface 511 for forming the first optical surface 12, the non-optical transfer surface 512 for forming the lens flange 11, and the tread transfer surface 543 for forming the formed rim 14. The tread transfer surface 543 is between the optical transfer surface 511 and the non-optical transfer surface 512. During the molding process, the optical transfer surface 511 allows to mold and lithograph the upper part of softened glass material being the first optical surface 12, the tread transfer surface 543 allows to mold the upper part of softened glass material into the formed tread 142 of two treads, and the non-optical transfer surface 512 can mold the softened glass material into the lens flange 11.

The molding method of the present embodiment is similar to which depicted in FIG. 6, but the difference is the upper mold 51 is configured with the tread transfer surface 543. The process comprises the following steps: placing preform 4 made of glass material in the mold cavity formed between the upper mold 51 and the lower mold 52. Then heating the upper mold 51, the lower mold 52, and the preform 4 by a heater 53, such that the preform 4 reaches its glass transition point and starts to melt; closing in the upper mold 51 and the lower mold 52 with pressure, which allows the optical transfer surface 512 of the upper mold 51, the optical transfer surface 522 of the lower mold 52, and the tread transfer surface 543 to mold the softened preform 4. After cooling, separating the upper mold 51 and the lower mold 52, thereby an optical lens 1 featuring the first optical surface 12, the second optical surface 13, the lens flange 11, and the formed tread 142 of two treads is obtained.

The formed rim 14 in the present embodiment comprises the formed tread 142 of two treads, radius of each tread $Rc_1$, $Rc_2$, and arc length $dc_1$, $dc_2$ preferably adjusted to be consistent with the curvature radius $R_1$ of the first optical surface 12.

Figure 14:
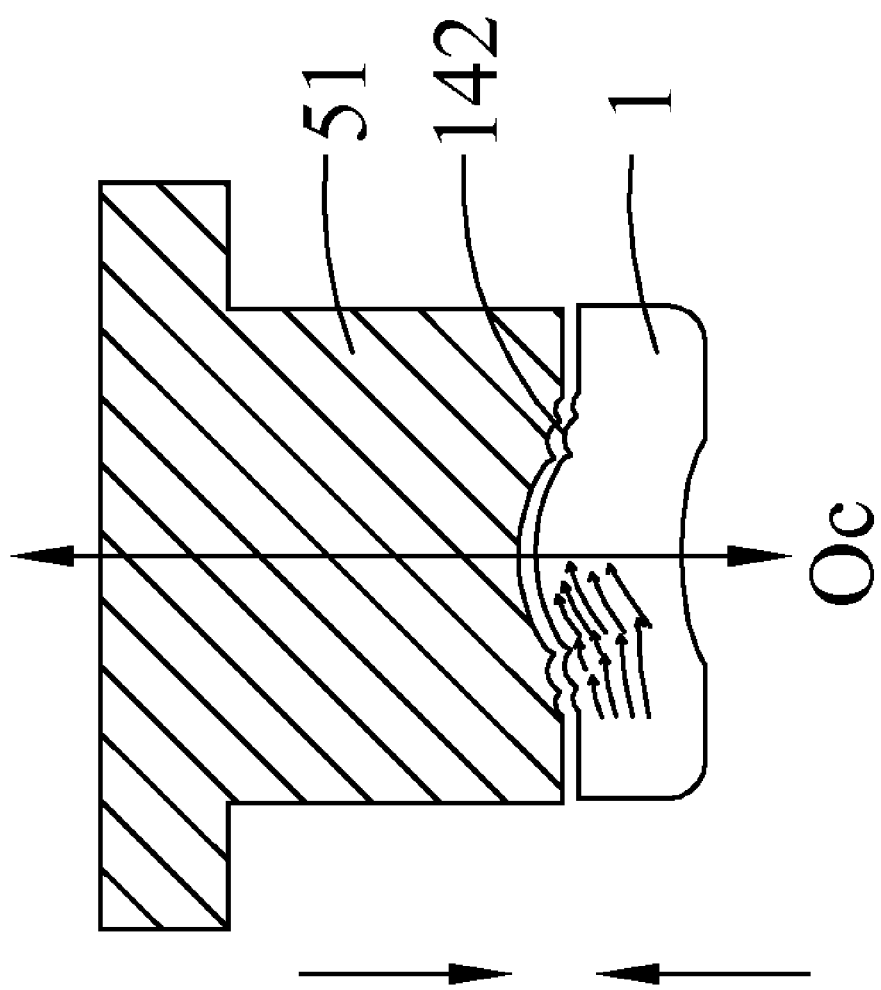
FIG. 14 shows a schematic diagram for the third embodiment of the present invention for squeezing the melted optical material by the forming aid fixture in the molding process.

Refer subsequently to FIG. 14, wherein a functional diagram of the forming aid fixture in the molding process for the third embodiment of the present invention is shown. When molding the optical lens 1, in the present embodiment, the upper mold 51 and the lower mold 52 squeeze the softened glass material, such that the softened glass material into the mold cavity starts to flow and is squeezed to try to attach to optical transfer surfaces, thereby driving the softened glass material closely attach to the optical transfer surface 511 of the upper mold 51 to form the first optical surface 12. Suppose that the curvature radius $R_1$ of the first optical surface 12 is small (greater curvature radius indicates higher SAG), it is not easy to make the softened glass material flow into the cavity and closely attach to the optical transfer surface 511. Conventionally, it usually applies higher temperature to further increase the liquidity of the glass material, or otherwise increase molding duration time and consume longer time for cooling. Whereas, in the present embodiment, through the tread transfer surface 543 of the upper mold 51, during the process of a relative motion of glass material and mold compression, the softened glass material under the tread transfer surface 543 is squeezed to move forward, such that the softened glass material is allowed to be pushed and closely attached to the optical transfer surface 511 so as to reach the objective of fast molding. Then the two formed treads 142 are molded simultaneously.

Figure 15:
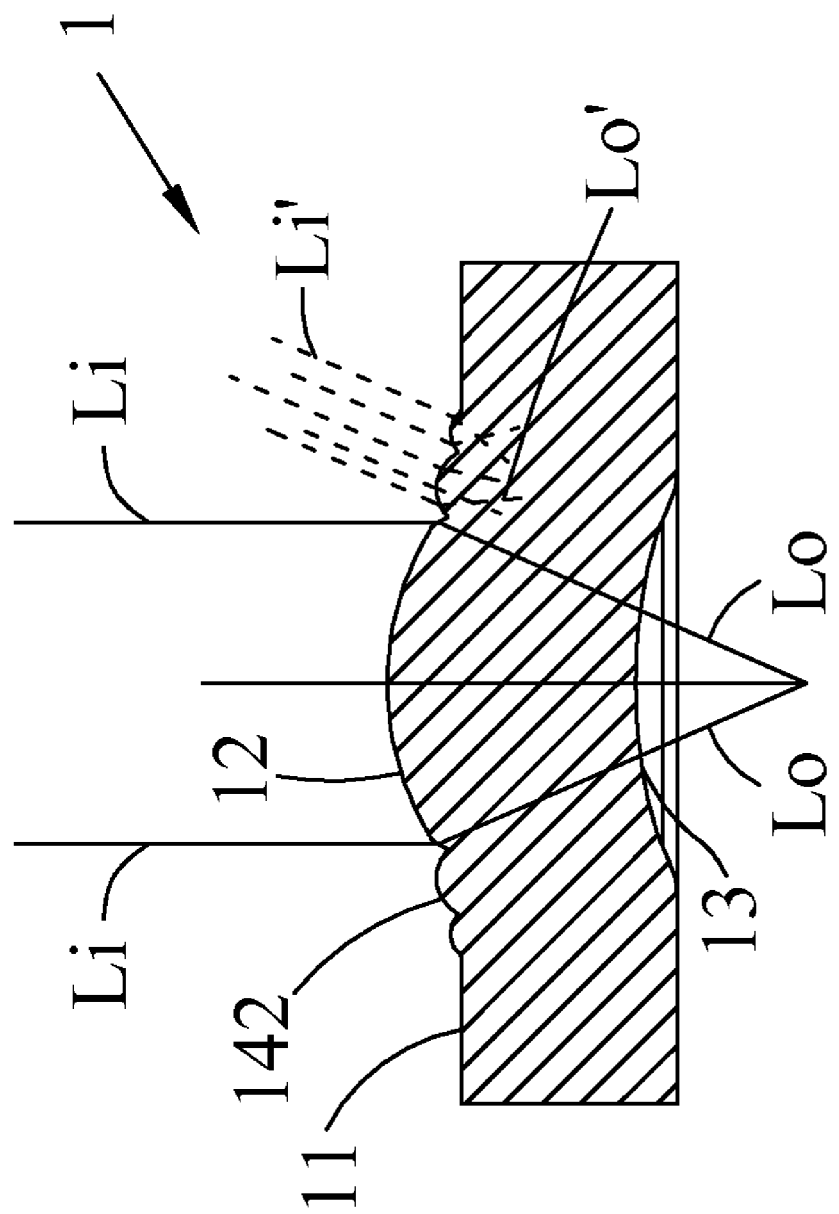
FIG. 15 shows an illustrative diagram of the third embodiment of the present invention for preventing the ghost image effect by the optical lens.

Refer also to FIG. 15, wherein an illustrative diagram for the third embodiment of the present invention for preventing the ghost image effect by the optical lens is shown. For the optical lens 1 with the formed tread 142 according to the present embodiment, the parallel light Li inside the range of the view angle of the first optical surface 12 is refracted by the first optical surface 12 into light Lo and focuses onto the optical axis Oc (only the convergence effect of the first optical surface 12 is depicted in the Figure). Since the formed tread 142 having two treads is configured between the first optical surface 12 and the lens flange 11, when light Li' outside the range of view angle of the first optical surface 12 is refracted by the formed rim 14 into light Lo'. Due to different radius and incident angles of the two treads, the incident light Li' be refracted into light Lo' with different angles, individually focusing to different locations, accordingly leading to scattering and preventing the ghost image effect.

Embodiment 4

Figure 16:
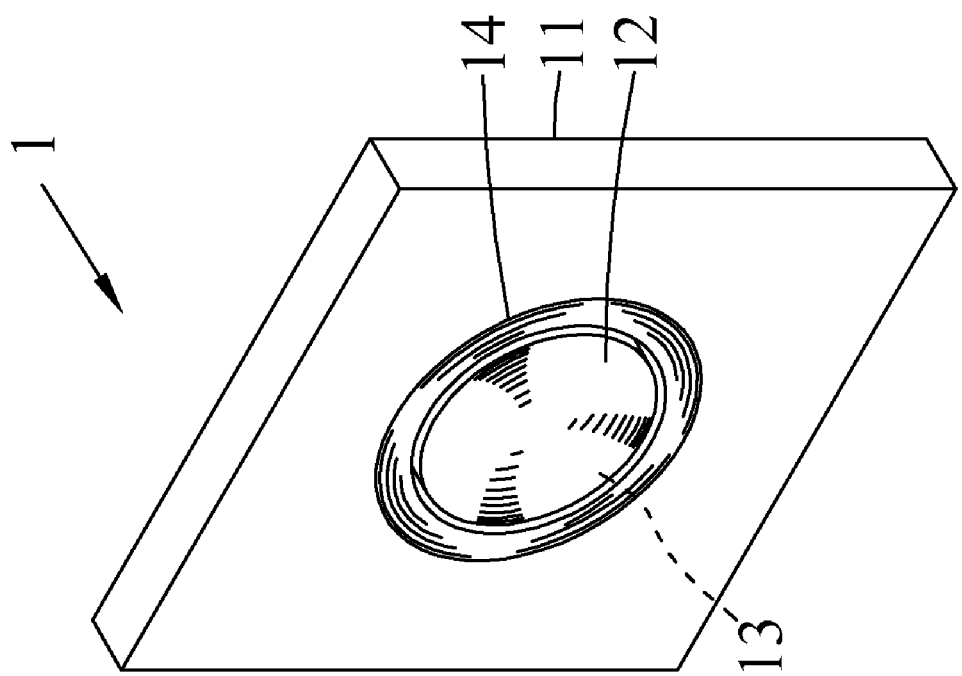
FIG. 16 shows a first diagram for a fourth embodiment of the present invention.

Refer next to FIG. 16, wherein a first diagram for a fourth embodiment of the present invention is shown. The high SAG optical lens 1 in the present embodiment has a square profile, which is configured with a recessed formed rim 14, made of optical glass material and comprising the first optical surface 12, the second optical surface 13, the formed rim 13, and the lens flange 14, in which the lens flange 11 is square and whose optical parameters are listed in Table 4 as below:

TABLE 4

Optical Parameter Table of Fourth Embodiment

| R1* | R2* | D | w | d |
|---|---|---|---|---|
| 0.47 | 0.80 | 1.92 | 0.11 | 0.05 |

*indicates aspheric surface

Herein $R_1$ is the radius (mm) of the first optical surface 12, $R_2$ is the radius (mm) of the second optical surface 13, L is the side length (mm) of the square optical lens 1, w is the width (mm) of the recessed formed indentation (the formed rim 14), d is the depth (mm) of the recessed formed indentation (the formed rim 14).

Figure 17:
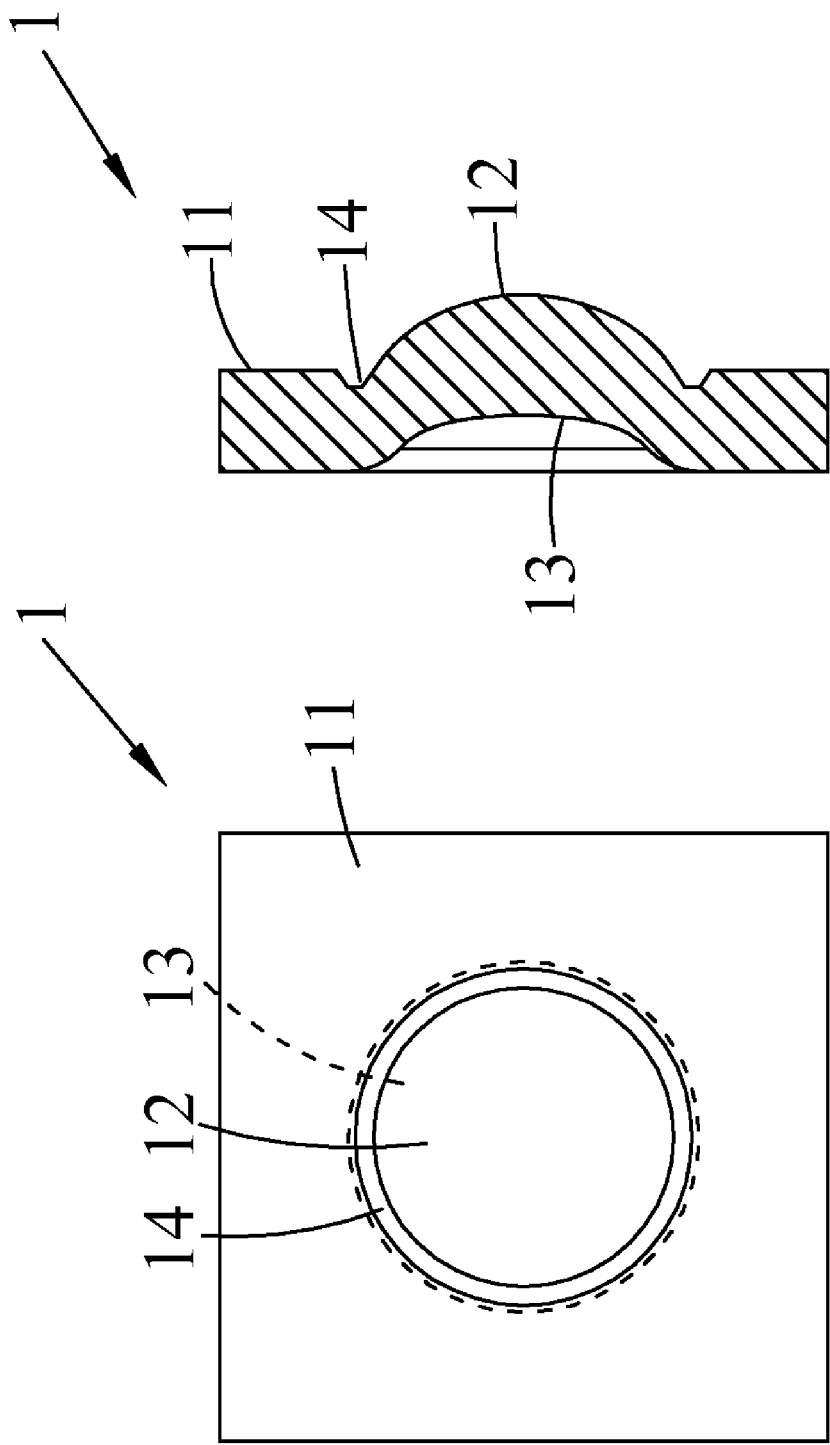
FIG. 17 shows a second diagram for the fourth embodiment of the present invention.

Refer now to FIG. 17, wherein a second diagram for the fourth embodiment of the present invention is shown. In the FIG. 17, for the mold employed in the present embodiment, there on the upper mold 51 is configured with an optical transfer surface 511 for forming the first optical surface 12, the non-optical transfer surface 512 for forming the lens flange 11, and the forming aid fixture 54 for forming the formed rim 14, in which the forming aid fixture 54 is between the optical transfer surface 511 and the non-optical transfer surface 512. During molding process, the optical transfer surface 511 allows to mold and lithograph the upper part of softened glass material into the first optical surface 12, the forming aid fixture 54 allows to mold the softened glass material being the formed rim 14 with a groove profile (the formed indentation), and the non-optical transfer surface 512 can mold the softened glass material into the lens flange 11.

The molding method thereof is similar to which depicted in FIG. 6, comprising the following steps: placing a glass plate into the mold cavity formed between the upper mold 51 and the lower mold 52. Then heat the upper mold 51, the lower mold 52, and the preform 4 by the heater 53, such that the preform 4 reaches its glass transition point and starts to melt; closing in the upper mold 51 and the lower mold 52 with pressure, which allows the optical transfer surface 512 of the upper mold 51, the optical transfer surface 522 of the lower mold 52, and the forming aid fixture 54 to mold the preform 4. After cooling, separating the upper mold 51 and the lower mold 52, thereby obtains an optical lens 1 featuring the first optical surface 12, the second optical surface 13, the square lens flange 11, and the formed rim 14.

Embodiment 5

Figure 18:
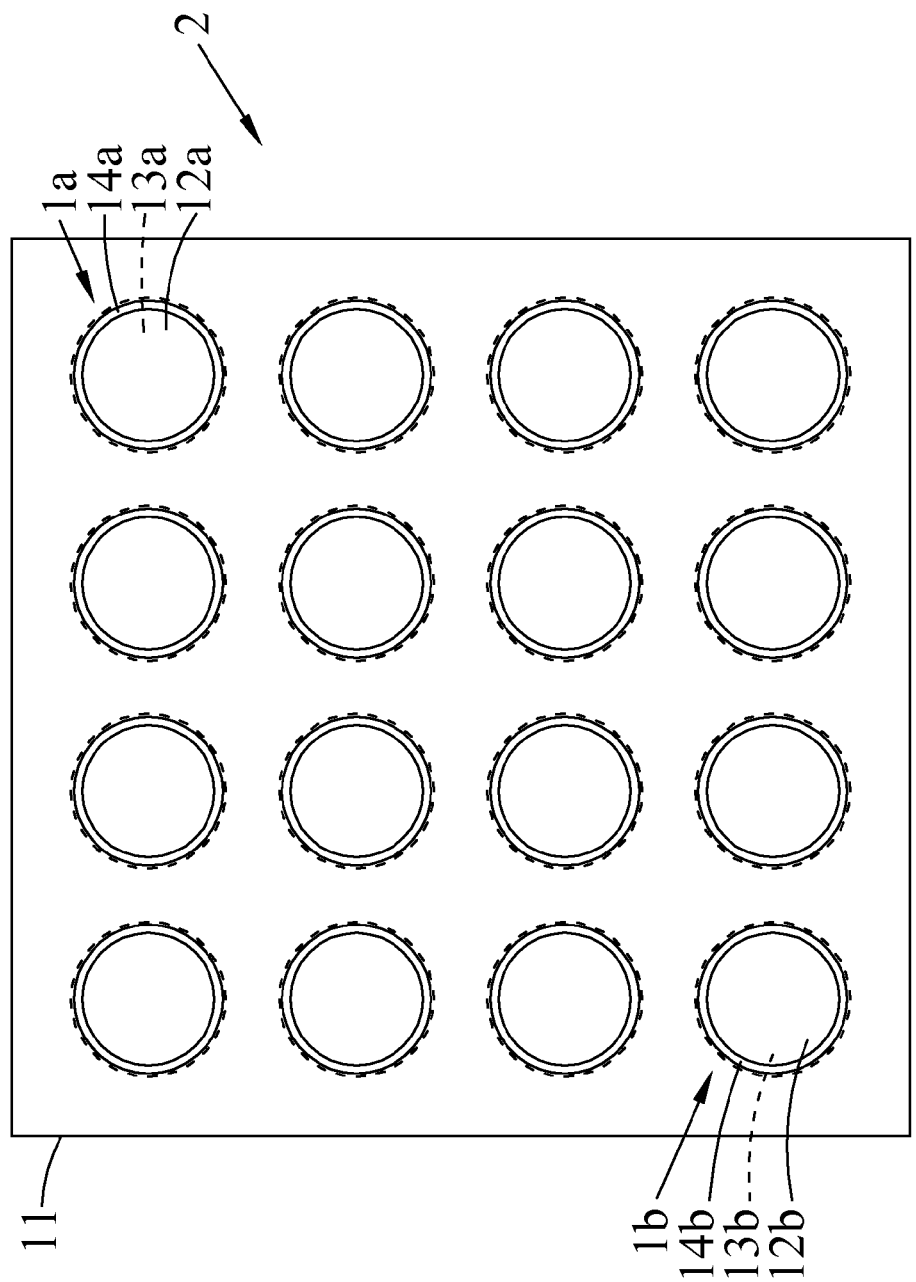
FIG. 18 shows a diagram for a fifth embodiment of the present invention.

Refer to FIG. 18, wherein a diagram for the fifth embodiment of the present invention is shown. The present embodiment illustrates an optical lens array 2 having a plurality of a plurality of high SAG optical lens 1 with individual formed rim 14, and method for manufacturing thereof. The optical lens array 2 is made of optical glass material comprising 4×4 high SAG optical lenses 1, but not limited thereto; after cutting the optical lens array 2, 16 square high SAG optical lenses 1 can be obtained, with each high SAG optical lens 1a (1b~) comprising the first optical surface 12a (12b~), the second optical surface 13a (13b~), the formed rim 14a (14b~); wherein each of the formed rim 14a (14b~) is a formed indentation of groove profile in example.

Refer now to FIG. 19, wherein a diagram for the manufacture method of glass molding the fifth embodiment of the present invention is shown. The manufacture method comprises the following steps:

SA1: providing a glass molding mold comprising an upper mold 51 configured with 4×4 upper transfer surfaces 511 arranged in array and a flange transfer surface, and a lower mold configured with 4×4 of lower transfer surfaces 521 and a flange transfer surface. The upper mold 51 (or the lower mold 52 for other application) is further configuring with 4×4 forming aid fixtures 54 arranged in an array and 4×4 indentation transfer surfaces 541 corresponding to such optical lenses and arranged in an array. The 4×4 forming aid fixtures 54 are connected to each upper/lower transfer surface 511/521 and the flange transfer surface;

SA2: placing a glass plate 4 into the mold cavity formed between the upper mold 51 and the lower mold 52;

SA3: heating and pressing the upper mold 51 and the lower mold 52 in order to mold the 4×4 optical transfer surfaces (the first optical transfer surface 511 and the second optical transfer surface 521), the 4×4 forming aid fixtures 54 onto the softened glass plate 4;

SA4: after cooling, separating the upper mold 51 and the lower mold 52, thereby obtaining an optical lens array 2 comprising 4×4 optical lenses 1a (1b~) with formed rim 14 arranged in an array;

SA5: cutting the optical lens array 2 and singularizing it into 16 single square optical lenses 1.

Through the aforementioned manufacture method, it is possible to efficiently produce 16 square glass high SAG optical lenses 1, each optical lens 1 featuring with the first optical surface 12, the second optical surface 13, and the formed rim 14.

The optical pickup lens utilized in an optical system is often using multiple pieces of optical lenses featuring various surface types and refraction powers, such as 2-pieced optical pickup lens, 3-pieced optical pickup lens etc. The piece of optical lens in optical pickup lens may usually be assembled with various optical components (e.g., apertures, spacers, light shields and the like). When the optical lens 1 is assembled with other optical lenses or optical components, it is common to apply cement glue for mutual adhesion and fixation. Whenever the optical lens 1 with the formed rim 14 disclosed by this invention is assembled, the groove shaped formed rim 14 can be used as the groove for containing glue overflow and allowed the glue to overflow into the formed rim 14 of formed indentation. Thereby preventing undesirable pollution to the optical surfaces of the optical lens 1 and improving yield of optical pickup lens production.

Embodiment 6

Refer again to FIG. 18, wherein a diagram for the sixth embodiment of the present invention is shown. The present embodiment illustrates an embodiment of an optical lens array 2 and a square high SAG optical lens 1 with the formed rim 14 and the manufacture method thereof. Whereas the optical lens array 2 is now made of an optical plastic material comprising 4×4 high SAG optical lenses 1, but not limited thereto. After cutting the optical lens array 2, 16 square plastic high SAG optical lenses 1 can be obtained. Each high SAG optical lens 1a (1b~) comprises the first optical surface 12a (12b~), the second optical surface 13a (13b~), the formed rim 14a (14b~) and the lens flange 11. Wherein the formed rim 14a (14b~) is a formed indentation of a groove profile in this embodiment but not limitation to.

Refer now to FIG. 20, wherein a diagram for the manufacture method of plastic molding the sixth embodiment of the present invention is shown. The manufacture method comprises the following steps:

SSA1: providing a plastic molding tool comprising the upper mold 51 configured with 4×4 upper transfer surfaces 511 arranged in array and a flange transfer surface, and a lower mold 52 configured with 4×4 lower transfer surfaces 521 arranged in array and a flange transfer surface. The upper mold 51/lower mold 52 (in this embodiment, only upper mold 51) is further configuring with 4×4 forming aid fixtures 54 corresponding to 4×4 upper transfer surfaces 511. Where the 4×4 forming aid fixtures 54 are connected to the 4×4 upper transfer surface and the flange transfer surface;

SSA2: closing in the upper mold 51 and the lower mold 52, heating the plastic material to melting by the heater 53;

SSA3: injecting the softened plastic material by an injection feeder 55 into the mold cavity formed between the upper mold 51 and the lower mold 52;

SSA4: clamping the upper mold 51 and the lower mold 52 in order to mold 4×4 upper transfer surfaces 511, 4×4 lower transfer surfaces 521, flange transfer surface and 4×4 forming aid fixtures 54 onto the softened plastic material;

SSA5: separating the upper mold 51 and the lower mold 52 after cooling, thereby obtaining an optical lens array 2 comprising 4×4 high SAG optical lenses (1a, 1b~); and;

SSA6: cutting the optical lens array 2 and singularizing it into 4×4 single high SAG optical lenses 1.

Through the aforementioned manufacture method, it is possible to efficiently produce 16 square plastic high SAG optical lenses 1, each optical lens 1 featuring with the first optical surface 12, the second optical surface 13 and the formed rim 14. When the optical lens 1 is assembled as an optical pickup lens, the formed rim 14 (if the groove shaped is used) can be further used as the groove for glue overflow, thereby improving yield of optical pickup lens production.

The aforementioned descriptions simply disclose the preferred embodiments of the present invention which are illustrative, rather than being limiting. Those skilled ones in the art can appreciate that any modifications, changes or even effectively equivalent substitutions may be performed without departing from the spirit and scope of the present invention, which are deemed as being encompassed by the present invention defined in the claims set forth hereunder.

What is claimed is:

1. A high SAG optical lens, formed by molding process of placing an optical material in mold cavity, heating and pressing to form a single optical lens, comprising: a first optical surface, a second optical surface, a lens flange and at least one formed rim;

wherein said first optical surface and said second optical surface are molded to form optically active zones oppositely;

said lens flange is molded to form optically inactive zone peripherally to said optically active zones;

said formed rim is molded with said first optical surface, said second optical surface and said lens flange simultaneously; and said formed rim is adjacent to said lens flange with one of first optical surface and second optical surface, and said formed rim refracts incident light outside a range of a view angle of the first optical surface for preventing ghost image effect, wherein said formed rim comprises a first formed tread and a second formed tread disposed between said first formed tread and said lens flange.

2. The high SAG optical lens according to claim 1, wherein said optical material is glass optical material or plastic optical material.

3. The high SAG optical lens according to claim 1, wherein said formed rim comprises a formed indentation.

4. The high SAG optical lens according to claim 3, further comprising a buffer surface disposed between the first optical surface and the formed rim.

5. The high SAG optical lens according to claim 1, wherein the diameter and the arc length of the second formed tread is smaller than the diameter and the arc length of the first formed tread respectively.

6. A high SAG optical lens array, formed by molding process of placing an optical material in mold cavity, heating and pressing to form an optical lens array which a plurality of optical lenses arranged in, comprising: a plurality of first optical surfaces, a plurality of second optical surfaces, a lens flange and a plurality of formed rims;
wherein said plurality of first optical surfaces and said plurality of second optical surfaces are molded to form optically active zones oppositely;
said lens flange is molded to form optically inactive zone peripherally to said optically active zones;
said plurality of formed rims are molded with said a plurality of first optical surface, said plurality of second optical surfaces and said lens flange simultaneously;
said plurality of formed rims are adjacent to said lens flange with one of each first optical surface and each second optical surface, and each of said plurality of formed rims refracts incident light outside a range of a view angle of a corresponding one of the first optical surfaces for preventing ghost image effect; and
the high SAG optical array can be cut and singularized to obtain a single high SAG optical lens, wherein each of said formed rims comprises a first formed tread and a second formed tread disposed between said first formed tread and said lens flange.

7. The high SAG optical lens array according to claim 5, wherein said optical material is glass optical material or plastic optical material.

8. The high SAG optical lens array according to claim 5, wherein each of said formed rims comprises a formed indentation.

9. The high SAG optical lens array according to claim 6, wherein the diameter and the arc length of the second formed tread is smaller than the diameter and the arc length of the first formed tread respectively.

10. A method for manufacturing high SAG optical lens, using a glass molding approach, comprising the following steps:
S1: providing a glass molding mold comprising an upper mold configured with an upper transfer surface and an upper flange transfer surface, and a lower mold configured with lower transfer surface and a lower flange transfer surface; at least one of said upper mold and said lower mold being further configured with a forming aid fixture connected to said upper/lower transfer surfaces and said upper/lower flange transfer surfaces;
S2: placing a preform of glass material into a mold cavity formed between said upper mold and said lower mold;
S3: heating and pressing both the upper mold and the lower mold in order to mold and transform said upper transfer surface, lower transfer surface, upper/lower flange transfer surface and said forming aid fixture onto the preform;
S4: separating said upper mold and said lower mold after cooling, thereby obtaining a high SAG optical lens featuring with a first optical surface, a said second optical surface and at least one formed rim adjacent to a lens flange;
wherein, said formed rim refracts incident light outside a range of a view angle of the first optical surface for preventing ghost image effect, wherein each of said formed rims comprises a first formed tread and a second formed tread disposed between said first formed tread and said lens flange.

11. A method for manufacturing high SAG optical lens, for producing an optical lens array by using a glass molding approach, comprising the following steps:
SA1: providing a glass molding mold comprising an upper mold configured with a plurality of upper transfer surfaces and an upper flange transfer surface, and a lower mold configured with a plurality of lower transfer surfaces and a lower flange transfer surface; at least one of said upper mold and said lower mold being further configured with a plurality of forming aid fixtures connected to said plurality of upper/lower transfer surfaces and said upper/lower flange transfer surfaces;
SA2: placing a preform of glass material into a mold cavity formed between said upper mold and said lower mold;
SA3: heating and pressing both said upper mold and said lower mold in order to mold and transform said plurality of upper transfer surfaces, said plurality of lower transfer surfaces, said upper/lower flange transfer surfaces and said plurality of forming aid fixtures onto the preform;
SA4: separating said upper mold and said lower mold after cooling, thereby obtaining an optical lens array comprising a plurality of high SAG optical lenses; and
SA5: cutting and singularizing the optical lens array and singularizing it into a plurality of single high SAG optical lenses, and each of the high SAG optical lenses having a first optical surface, a second optical surface, a lens flange and a formed rim;
wherein, said formed rim refracts incident lights outside a range of a view angle of the first optical surface for preventing ghost image effect, wherein each of said formed rims comprises a first formed tread and a second formed tread disposed between said first formed tread and said lens flange.

12. A method for manufacturing a high SAG optical lens, using a plastic molding approach, comprising the following steps:
SS1: providing a plastic molding mold comprising an upper mold configured with an upper transfer surface and an upper flange transfer surface, and a lower mold configured with lower transfer surface and a lower flange transfer surface; at least one of said upper mold and said lower mold being further configured with a forming aid fixture connected to said upper/lower transfer surface and said upper/lower flange transfer surface;
SS2: closing the upper mold and the lower mold;
SS3: injecting softened plastic material into a mold cavity formed between said upper mold and said lower mold by an injection feeder;
SS4: clamping said upper mold and said lower mold in order to mold and transform said upper transfer surface, said lower transfer surface, said upper/lower flange transfer surface and said forming aid fixture onto the softened plastic material;
SS5: separating the upper mold and the lower mold after cooling, thereby obtaining a high SAG optical lens featuring with a first optical surface, a second optical surface and at least one formed rim adjacent to a lens flange;

wherein, said formed rim refracts incident lights outside a range of a view angle of the first optical surface for preventing ghost image effect, wherein each of said formed rims comprises a first formed tread and a second formed tread disposed between said first formed tread and said lens flange.

13. A method for manufacturing high SAG optical lens, for producing an optical lens array by using a plastic molding approach, comprising the following steps:

SSA1: providing a plastic molding mold comprising an upper mold configured with a plurality of upper transfer surfaces and an upper flange transfer surface, and a lower mold configured with a plurality of lower transfer surfaces and a lower flange transfer surface; at least one of said upper mold and said lower mold being further configured with a plurality of forming aid fixtures connected to said a plurality of upper/lower transfer surface and said upper/lower flange transfer surface;

SSA2: closing the upper mold and the lower mold;

SSA3: injecting softened plastic material into a mold cavity formed between said upper mold and said lower mold by an injection feeder;

SSA4: clamping said upper mold and said lower mold in order to mold and trans form said plurality of upper transfer surfaces, said plurality of lower transfer surfaces, said upper/lower flange transfer surfaces and said plurality of forming aid fixtures onto the softened plastic material;

SSA5: separating said upper mold and said lower mold after cooling, thereby obtaining an optical lens array comprising a plurality of high SAG optical lenses; and SSA6: cutting said optical lens array and singularizing it into a plurality of single high SAG optical lenses, and each of the high SAG optical lenses having a first optical surface, a second optical surface, a lens flange and a formed rim;

wherein, said each of formed rims refracts incident light outside a range of a view angle of a corresponding one of the first optical surfaces for preventing ghost image effect, wherein each of said formed rims comprises a first formed tread and a second formed tread disposed between said first formed tread and said lens flange.

* * * * *